United States Patent [19]
Linak et al.

[11] Patent Number: 5,972,301
[45] Date of Patent: Oct. 26, 1999

[54] MINIMIZING EMISSION OF HEXAVALENT CHROMIUM FROM COMBUSTION SOURCES

[75] Inventors: William P. Linak, Raleigh, N.C.; Jost O. L. Wendt, Tucson, Ariz.

[73] Assignee: The United States of America as represented by the Environmental Protection Agency, Washington, D.C.

[21] Appl. No.: 08/868,258

[22] Filed: Jun. 3, 1997

Related U.S. Application Data

[60] Provisional application No. 60/018,984, Jun. 4, 1996.

[51] Int. Cl.$^6$ .......................... C01G 37/00; C01G 37/02; A62D 3/00; F23J 3/00
[52] U.S. Cl. ................................ 423/53; 423/59; 423/60; 423/607; 588/236; 110/344; 431/2; 431/4
[58] Field of Search ...................................... 110/344, 345, 110/346; 588/236; 423/59, 60, 607, 53; 431/2, 4; 210/913, 720

[56] References Cited

U.S. PATENT DOCUMENTS 3,968,756  7/1976  Yamada ..................................... 110/12
5,245,120  9/1993  Srinivasachar et al. ................ 588/256

FOREIGN PATENT DOCUMENTS 52-052176  4/1977  Japan .

OTHER PUBLICATIONS

Linak, William P. et al., Formation and destruction of hexavalent chromium in a laboratory swirl flame incinerator, Journal of Combstion Science and Technology, p. 116–117, Jun. 1995.

Linak et al., Toxic Metal Emissions from Incineration: Mechanism and Control, Prog. Energy Combust. Science, p 145–185, Apr. 1993.

*Primary Examiner*—Gary P. Straub
*Assistant Examiner*—Melanie C. Wong
*Attorney, Agent, or Firm*—Browdy and Neimark

[57] ABSTRACT

Formation of hexavalent chromium is reduced during incineration/combustion of materials containing hexavalent chromium by adding to the waste prior to or during combustion a small amount of sulfur. The sulfur can be added as elemental sulfur, as sulfur dioxide, or as high sulfur fuels or high sulfur waste.

6 Claims, 13 Drawing Sheets

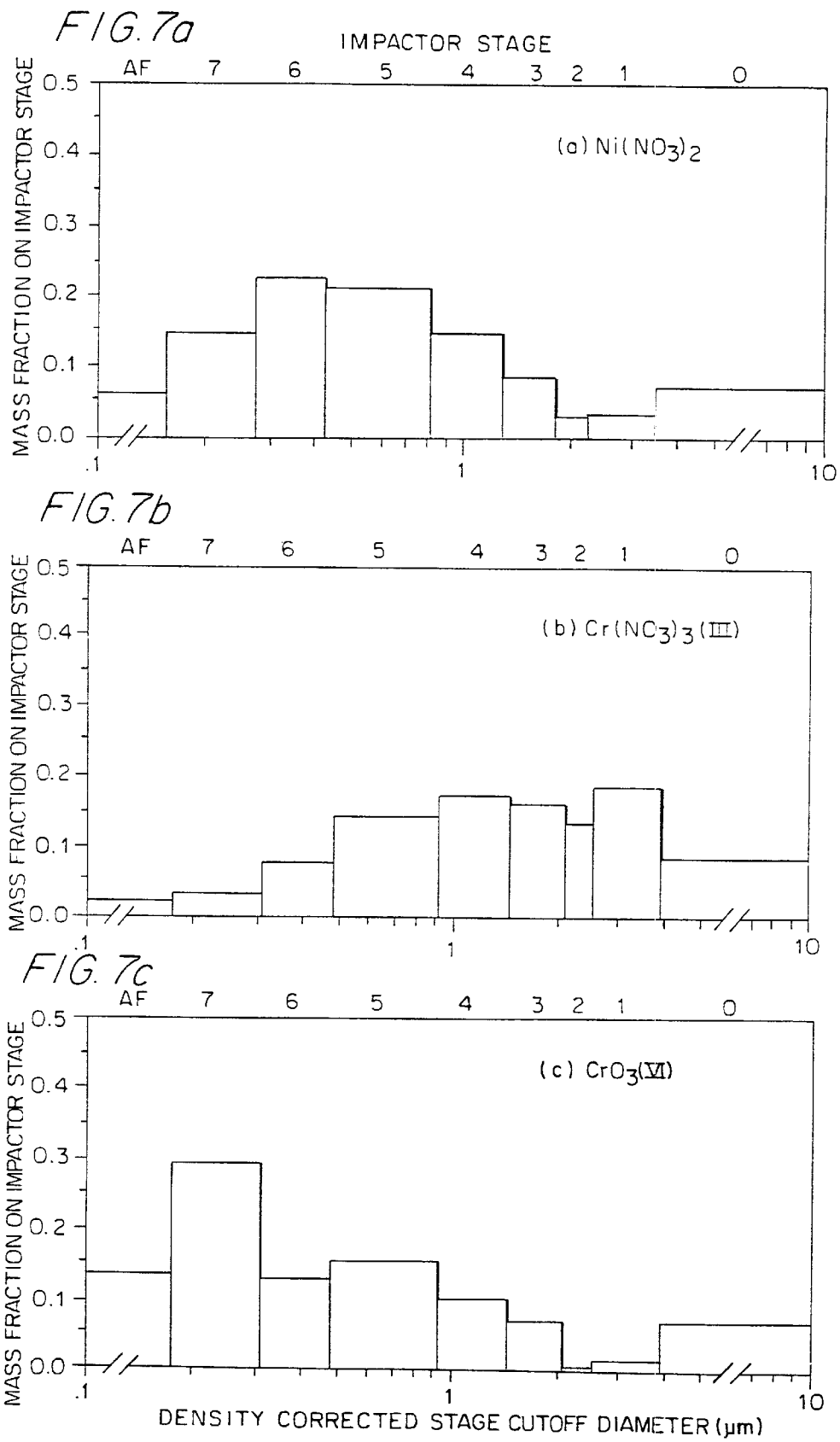

△ $CrO_3(VI)$
+ $CrO_3(VI)$ w/ $O_2$ ENRICHMENT
× $CrO_3(VI)$ w/ Cl AND $O_2$ ENRICHMENT

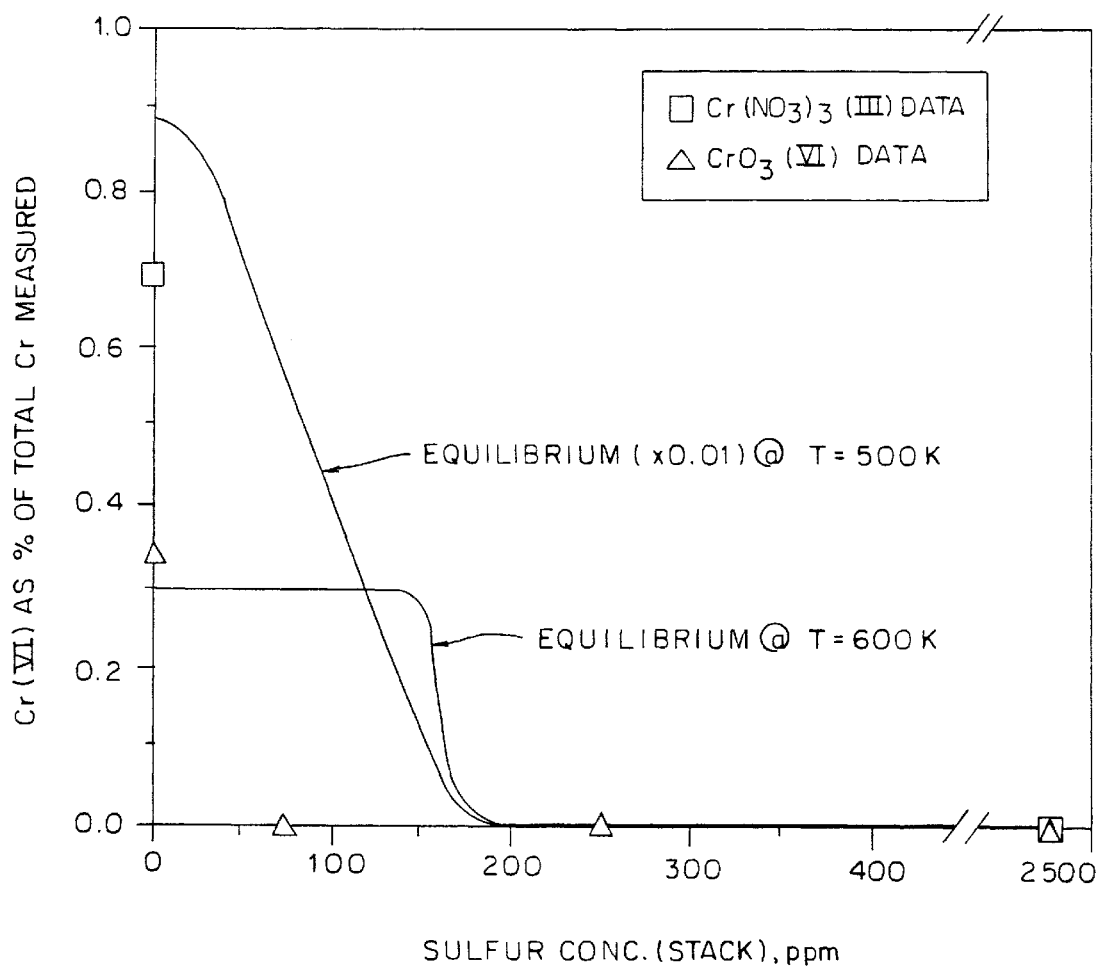

MINIMIZING EMISSION OF HEXAVALENT CHROMIUM FROM COMBUSTION SOURCES

The present application is a continuation in part of provisional application Serial No. 60/018,984, filed Jun. 4, 1996, the entire contents of which are hereby incorporated by reference.

FIELD OF THE INVENTION

The present invention relates to a method for minimizing emissions of hexavalent chromium from combustion sources.

BACKGROUND OF THE INVENTION

Chromium is a toxic metal that is regulated in the U.S. by the Clean Air Act (CAA, 1990) and the Resource Conservation and Recovery Act (RCRA, 1986). The Resource Conservation and Recovery Act, which regulates hazardous waste incinerators and boilers and industrial furnaces using hazardous waste fuels, uses risk assessment arguments to limit human exposure. Allowable ground level concentrations, to which the maximum exposed individual is subjected, are determined based upon risk specific doses for four carcinogenic metals and reference air concentrations for eight non-carcinogenic metals. Only the hexavalent form of chromium, Cr(VI), is considered to be a potent carcinogen, and its risk specific dose is correspondingly very low (0.00083 $\mu 5g/m^3$). Data on chromium speciation in combustion exhaust gases are not readily available, and it is not clear that Cr(VI) is the dominant form, or even a significant portion, of total Cr in incinerator exhausts. However, for the purposes of conforming to the Resource Conservation and Recovery Act, all chromium is assumed to be Cr(VI) unless site specific speciation is performed, which is difficult and expensive. Based upon this assumption, chromium emissions are often a major contributor to the health risk assessment conducted at waste incineration facilities (Bailiff and Kelly, 1990).

Many fossil fuels and incineratable wastes contain chromium constituents. Chromium, like other metallic elements, cannot be destroyed during combustion or incineration processes, although high temperature environments will induce metal transformations. These physical and chemical transformations may exacerbate their harmful effects, since many of the metal species react with other constituents and readily vaporize within combustion environments. Prior experimental work has demonstrated that chromium species introduced into a combustion environment react with other constituents and partition into hexavalent (toxic) and non-hexavalent (relatively non-toxic) species in the exhaust gas. It has been found that adding chlorine increases the fraction of hexavalent chromium, presumably due to the formation of $CrCl_6$.

Chromium occurs in oxidation states ranging from divalent (II) to hexavalent (VI) (Goyer, 1991). However, only trivalent (III) and hexavalent (VI) states are commonly found in the environment (Seigneur and Constantinou, 1995). Of these two, Cr(III) is the more abundant form, while Cr(VI) compounds are more important industrially. Anthropogenic chromium in ambient air originates from fossil fuel combustion, waste incineration, and industrial sources such as ferrochrome processing, ore refining, and chemical, refractory, and cement production. Cr(III) oxide, $Cr_2O_3$, is present in high temperature refractories, and has been shown to promote sulfur capture by calcium products in hot combustion flue gases (Slaughter et al., 1987). Anthropogenic sources account for 60–70% of the atmospheric chromium emissions, with natural sources accounting for the remaining 30–40% (Seigneur and Constantinou, 1995). Typical ambient concentrations of total chromium range from less than 0.0001 $\mu g/m^3$ in rural areas to 0.03 $\mu g/m^3$ in industrial cities (Goyer, 1991).

At ambient conditions, the vapor pressures of chromium species are negligible; only condensed phases are present. As a result, chromium atmospheric chemistry is associated with solid particles and aqueous droplets. Seigneur and Constantinou (1995) have reviewed the solution chemistry for chromium and developed a kinetic mechanism to describe the conversion of Cr(III) to Cr (VI) and Cr(VI) to Cr(III). They concluded that typical atmospheric conditions favor the reduction of Cr(VI) to Cr(III) species through reactions with trivalent arsenic [As(III)], divalent iron [Fe(II)], vanadium, or sulfur dioxide, although slow oxidation of Cr(III) to Cr(VI) is also possible under some extreme conditions through reactions with manganese.

There is no evidence that Cr(III) is converted to Cr(VI) in biological systems. However, Cr(VI), being a strong oxidizing agent, readily crosses cell membranes where it is reduced to Cr(III) (Trinchon and Feldman, 1989; Goyer, 1991). It has been speculated that the biological effects of Cr(VI) are associated with its biological mobility, reduction to Cr(III), and the formation of intracellular Cr(III) macromolecules (Goyer, 1991). Chromium does not bioaccumulate in the body with the exception of the lungs (Trinchon and Feldman, 1989). Exposure to Cr(VI) is most commonly associated with cancer of the respiratory system, although other adverse health effects including skin ulcers, allergic dermatitis and nasal perforations have been identified (Trinchon and Feldman, 1989; Goyer, 1991).

Thus, Cr(VI), but not Cr(III), has been determined to pose a significant human health hazard. The ensuing health risk depends upon exposure to Cr(VI), but not necessarily upon exposure to total chromium. Since conversion of Cr(III) to Cr(VI) is unlikely through atmospheric or biological mechanisms (Seigneur and Constantinouu, 1995; Goyer, 1991), the major route for human exposure is likely through direct (anthropogenic) releases of Cr(VI) into the environment. It is, therefore, important to determine what portion of total chromium emissions from combustion sources might consist of Cr(VI) and how this depends on combustion conditions, other fuel constituents, and the valence state of chromium entering the system.

It is difficult to measure chromium partitioning in gases for two reasons. First, the dominant chromium species predicted by equilibrium [$Cr_2O_3(s)$, cf. FIG. 1] is a condensed species which is difficult to digest for subsequent analysis. Second, care must be taken to ensure that Cr(VI) is not reduced during the sampling and analysis process. This is usually accomplished by keeping the sample in contact with an alkaline environment at all times. The converse problem of oxidizing chromium to Cr(VI) species is not an issue at room temperatures (Seigneur and Constantinou, 1995).

Current models describing chromium partitioning in combustion systems are based on chemical equilibrium. It is important to note, however, that equilibrium may not be achieved in a particular system because of kinetic rate or mixing limitations. In addition, any equilibrium prediction is only as good as the thermochemical information available. Previous studies which included equilibrium predictions or chromium partitioning (Barton et al., 1990; Linak and Wendt, 1993) had access to thermodynamic properties of only a limited number of chromium species, and predicted trends of increased volatility and increased Cr(VI) concentrations caused by large quantities of chlorine.

To date, there has been no way to measure the trace quantities of hexavalent chromium in combustion air streams to determine the exact concentrations of hexavalent chromium and then to convert the hexavalent chromium to trivalent chromium.

SUMMARY OF THE INVENTION

It is an object of the present invention to overcome the aforementioned deficiencies in the prior art.

It is another object of the present invention to provide a technique for measuring trace quantities of hexavalent chromium in air.

It is another object of the present invention to provide a method for reducing hexavalent chromium in air to trivalent chromium.

It is another object of the present invention to provide a method for removing hexavalent chromium from combustion air streams.

According to the present invention, adding small amounts of sulfur to low sulfur fuels and incinerable wastes dramatically reduces the fraction of hexavalent chromium species. Thus, according to the present invention, controlled amounts of sulfur are added to chromium containing low sulfur fuels and incinerable wastes, or chromium and sulfur-containing incinerable wastes are intentionally mixed in order to minimize formation and emission of hexavalent chromium.

In order to minimize the amount of hexavalent chromium in exhaust gases from an incineration or combustion process, an added amount of sulfur at least equimolar to the amount of chromium in the waste to be incinerated or combusted is sufficient to ensure that the chromium remaining after the waste has been incinerated or combusted will be converted to or remain as Cr(III). The sulfur must be present while the fuel combusts in order to maximize the kinetic processes which convert Cr(VI) to Cr(III), or which maintain Cr(III) in that valence state. Since many fuels and wastes contain varying amounts of sulfur, from none up to about 10,000 ppm, or 1%, it may not be necessary to add to the fuel or waste all of the sulfur which is needed to be equimolar to the chromium present in the fuel or waste.

The conversion of Cr(VI) to Cr(III) occurs at flame temperatures. Thus, there is no requirement for additional heat input, as the act of combustion or incineration, which occurs at flame temperatures, converts the Cr(V) to Cr(III). The sulfur must be present while the fuel combusts; the sulfur can be added to the waste or fuel at any time up to and including the time of actual incineration.

BRIEF DESCRIPTION OF THE DRAWINGS

FIG. 5 shows nickel and chromium predictions for four experimental conditions:

FIG. 5b, 2500 ppm chlorine, 0 ppm sulfur;

FIG. 5c, 0 ppm chlorine, 2500 ppm sulfur;

FIG. 5d, 2500 ppm chlorine, 2500 ppm sulfur.

FIG. 6 shows particle volume distribution measured by electrical mobility and light scattering for:

FIG. 7 shows particle mass fraction distributions measured by gravimetric inertial impaction for:

FIG. 7a, $Ni(NO_3)_2$;

FIG. 7b, $Cr(NO_3)_3$(III);

FIG. 7c $CrCO_3$(VI) aqueous solution feeds.

FIG. 9 shows field emission scanning electron micrographs of particles collected on a silver filter during $Cr(NO_3)_3$ (III) aqueous solution feeds with chlorine.

FIG. 9a, 3,000×;

FIG. 9b, 9,000×; FIG. 9c, 45,000×.

FIG. 10 shows the effect of sulfur stack concentration on Cr(VI) emissions. the symbols represent data for $Cr(NO_3)_3$ (III) and $CrO_3$(VI) aqueous solution feeds. The curves represent equilibrium predictions at 500 and 600° K.

FIG. 11 shows particle volume distributions measured by electrical mobility and light scattering for:

DETAILED DESCRIPTION OF THE INVENTION

In order to minimize the amount of hexavalent chromium in exhaust gases from combustion and incineration, sulfur in amounts ranging from about 100 to about 10,000 ppm is added to the mixture to be burned. The sulfur can be added in the form of elemental sulfur, high sulfur hydrocarbons, or even in the form of high sulfur waste. The hexavelent chromium, which is extremely toxic, is converted by the sulfur to trivalent chromium, which is considerably less toxic than the hexavalent chromium.

Equilibrium calculations indicate that a variety of chromium oxides, chlorides, oxyhydroxides, oxychlorides, and sulfates are thermodynamically stable under high temperature oxidative conditions, and the predicted species distribution varies as a function of temperature and elemental concentration. In the absence of sulfur, hexavalent chromium chlorides and oxychlorides are predicted to be stable at low temperatures while, in the presence of sulfur, trivalent chromium sulfates dominate at low temperatures.

Experiments were conducted to examine chromium speciation as a function or initial valence and chlorine and sulfur concentration. Aqueous solutions of hexavalent chromium oxide ($CrO_3$) and trivalent chromium nitrate [$Cr(NO_3)_3$] were injected along with chlorine and sulfur dioxide gases through a variable swirl burner into an 82 kW refractory-lined incinerator simulator, shown in FIG. 2. Stack measurements characterized the resultant particle size distributions as well as the partitioning between hexavalent and total chromium.

Figure 3A:
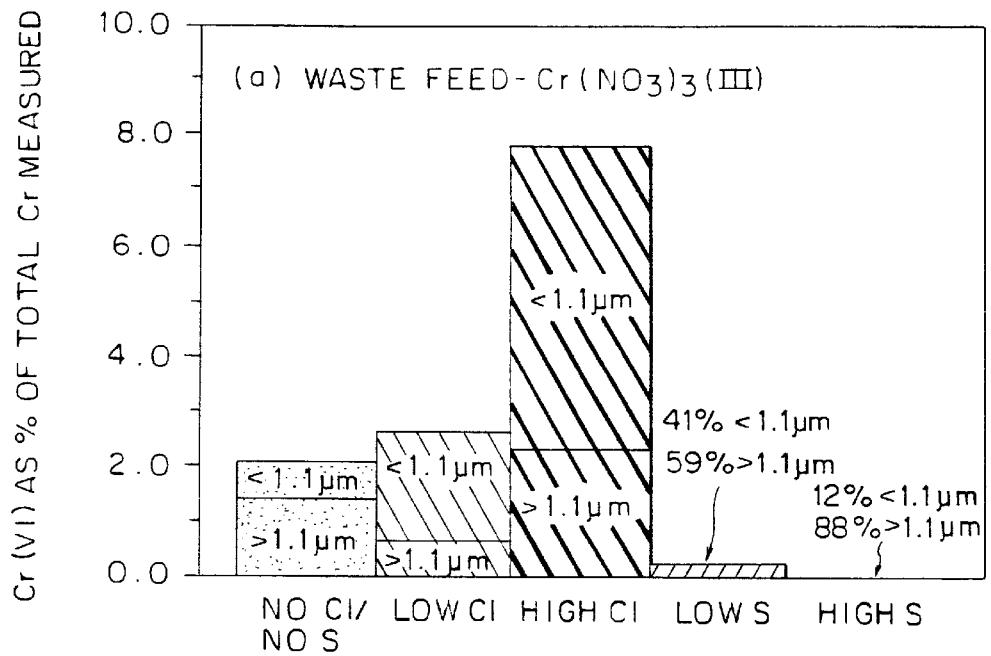
FIG. 3a shows Cr(VI) mass as a percent of total chromium mass measured in stack gases as a function of chromium waste feed valence and acid gas added for $Cr(NO_3)_3$ (III) waste feed.
Figure 3B:
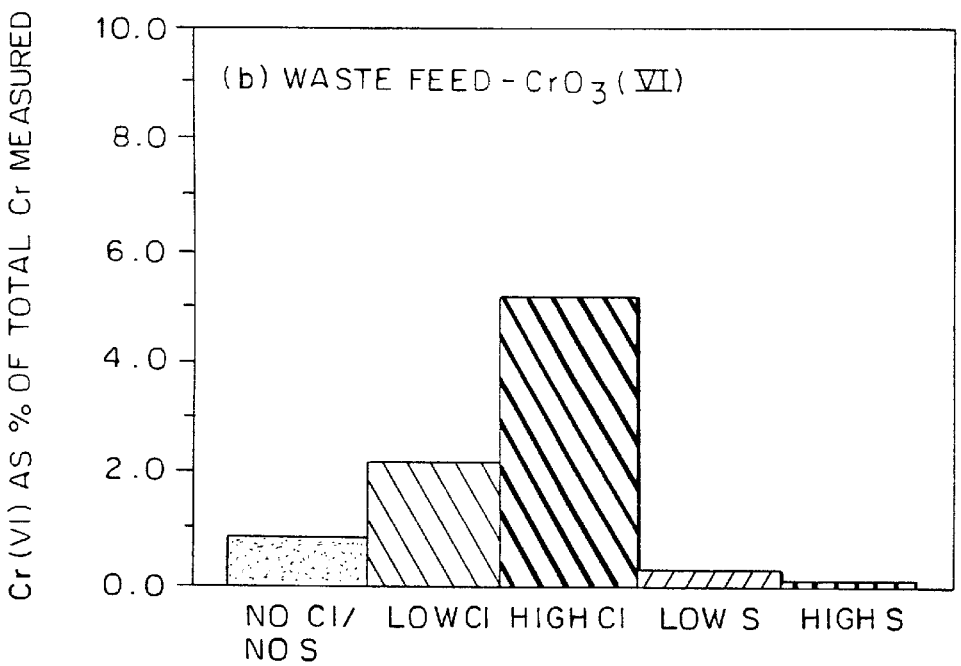
FIG. 3b shows Cr(VI) mass as a percent of total chromium mass measured in stack gases as a function of chromium waste feed valence and acid gas added for $CrO_3$(VI) waste feed.

Comparison of the equilibrium predictions shown in FIG. 1 and hexavalent chromium/total chromium partitioning data, shown in FIG. 3b, suggests that some type of equilibrium mechanism, with fast kinetics, may control the partitioning of chromium species in incineration environments. The data indicate that the relative ratio of hexavalent chromium/total chromium is unaffected by the initial chromium valence in the waste. When chlorine is added, equilibrium predicts hexavalent chromium species to be favored at stack conditions, and the data indicate that hexavalent chromium species increase to between 5 and 8% of the total chromium measured. The equilibrium prediction and data also indicate that the presence of sulfur greatly inhibits the formation of hexavalent chromium species. With sulfur addition, the data indicate that less than 0.5% of the total chromium is partitioned to hexavalent chromium species.

Table 1 presents the chromium species considered. Table 2 shows the input concentrations used for the calculations. In the Figure, the dashed lines represent Cr(VI) species.

TABLE 1

Chromium Products Considered During Equilibrium Analysis

| Chromium Products without Chlorine or Sulfur | Additional Products with Chlorine | Additional Products with Sulfur |
|---|---|---|
| Cr | CrCl | CrS (1) |
| CrN | $CrCl_2$ | CrS (2) |
| CrO | CrOCl | $Cr_2(SO_4)_3$ (s) |
| CrOH | $CrCl_3$ | |
| $CrO_2$ | $CrOCl_2$ | |
| CrOOH | $CrCl_4$ | |
| $Cr(OH)_2$ | $CrO_2Cl$ | |
| $CrO_3$ | $CrOCl_3$ | |
| $CrO_2OH$ | $CrCl_5$ | |
| $Cr(OH)_3$ | $CrO_2Cl_2$ | |
| $CrO(OH)_2$ | $CrOCl_4$ | |
| $CrO_2(OH)_2$ | $CrCl_6$ | |
| $Cr(OH)_4$ | $CrCl_2$ (s) | |
| $CrO(OH)_4$ | $CrCl_2$ (l) | |
| $Cr(OH)_5$ | $CrCl_3$ (s) | |
| $Cr(OH)_6$ | | |
| Cr (s) | | |
| Cr (l) | | |
| $Cr_7C_3$ (s) | | |
| $Cr_{23}C_6$ (s) | | |
| $Cr(CO)_6$ (s) | | |
| CrN (s) | | |
| $Cr_2N$ (s) | | |
| $CrO_2$ (s) | | |
| $CrO_3$ (s) | | |
| $CrO_3$ (l) | | |
| $Cr_2O_3$ (s) | | |
| $Cr_2O_3$ (l) | | |

The results obtained above indicate that hexavalent chromium species may actually be only a small fraction of the total chromium emitted in the stack gases from incineration/combustion systems. However, this fraction is dependent upon acid gas concentrations, but not on the initial waste chromium valence. The results suggest that even in the presence of chlorine, hexavalent chromium emissions may be minimized by the addition of small amounts of sulfur, which promote the formation of $Cr_2(SO_4)_3$(III). This process modification offers a control procedure to ensure minimizing emissions of hexavalent chromium from incineration/combustion systems.

FIG. 1 shows equilibrium predictions using the Ebbinghaus thermochemistry (Ebbinghaus 1993, 1995) as well as the existing JANAF thermochemical data set. Cr(VI) species are represented by dashed lines. FIG. 1a shows chromium partitioning in the absence of chlorine and sulfur, and represent experimental conditions shown in Table 2. $CrO_2(OH)_2$(VI) is predicted to be stable in relatively low concentrations at intermediate and high temperatures (1200 and 2000° K). However, at temperatures less than 1700° K chromium speciation is dominated by $Cr_2O_3$ and $CrO_2$.

Figure 1A:
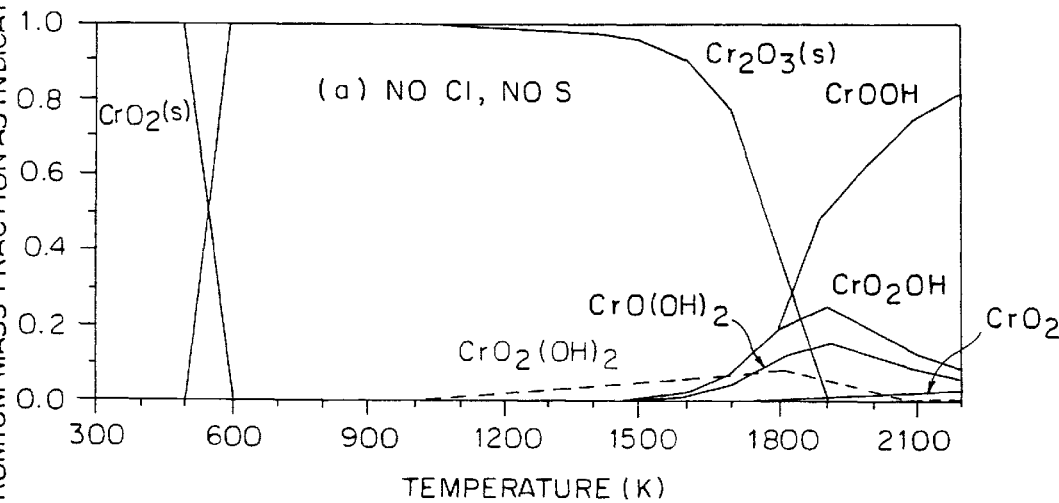
FIG. 1a shows chromium equilibrium predictions for an experimental condition base case in the absence of chlorine and sulfur.
Figure 1B:
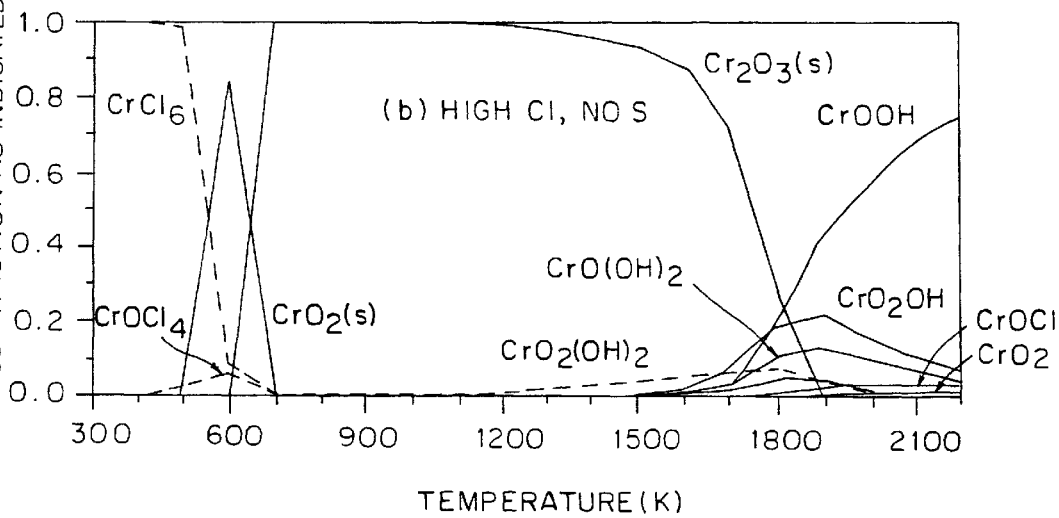
FIG. 1b shows chromium equilibrium predictions for an experimental condition having a high concentration of chlorine and no sulfur.

FIG. 1b shows chromium partitioning with 6700 ppm chlorine added to the incoming mixture, cf. Table 2. A major change with respect to Cr(VI) partitioning occurs, with the presence of large quantities of vapor-phase $CrCl_6$(VI) predicted to be stable at low temperature, i.e., less than 700° K. Chlorine is thus predicted to enhance the formation of Cr(VI).

Figure 1C:
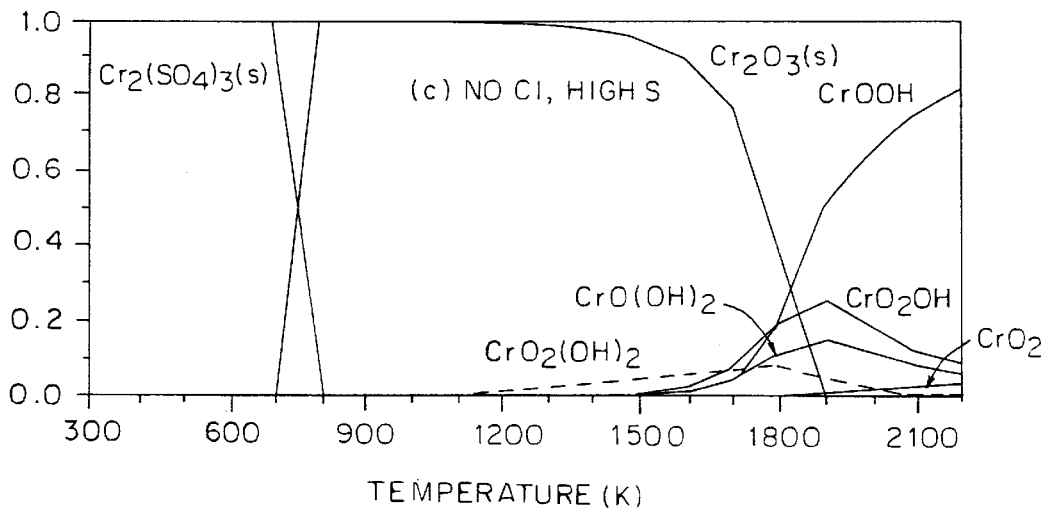
FIG. 1c shows chromium equilibrium predictions for an experimental condition having no chlorine and a high concentration of sulfur.
Figure 1D:
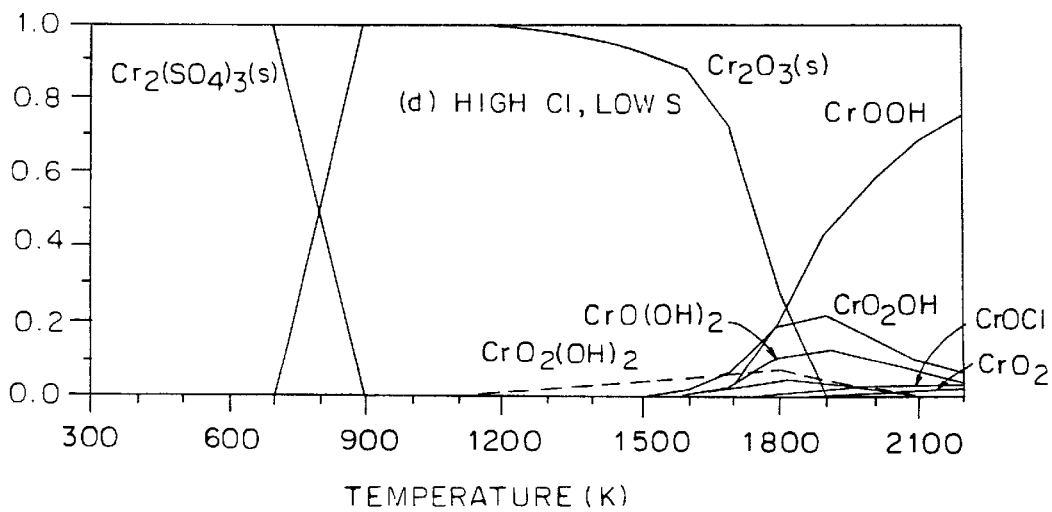
FIG. 1d shows chromium equilibrium predictions for an experimental condition having a high concentration of chlorine and a low concentration of sulfur.

FIG 1c depicts the effects of adding 7900 ppm sulfur. Although some $CrO_2(OH)_2$(VI) is predicted to be present at intermediate and high temperatures (1200 and 2000° K), the lower temperature region, less than 800° K, is completely dominated by trivalent $Cr_2(SO_4)_3$(III). FIG. 1d shows that relatively small amount of sulfur, i.e., about 100 ppm, with a large amount of chlorine (6700 ppm) are predicted to displace the chloride from the chromium salt and to form the $Cr_2(SO_4)_3$(III), replacing the $CrCl_6$(VI). Equilibrium predictions suggest that, although some Cr(VI) compounds are favored at high temperatures, they are not favored at low temperatures in the absence of chlorine. When chlorine is added, Cr(VI) species are favored at stack conditions. Cr(VI) disappears in the exhaust with the addition of relatively small amounts of sulfur, even in the presence of larger amounts of chlorine.

Experimental

The speciation of chromium in the exhaust of a practical combustion system was investigated as functions of inlet chromium speciation (valence) and chlorine and sulfur content. Additionally, the influence of inlet chromium speciation on the exhaust aerosol particle size distribution (PSD) was determined. Both speciation and particle size affect the health risks associated with chromium aerosol air emissions.

Figure 2:
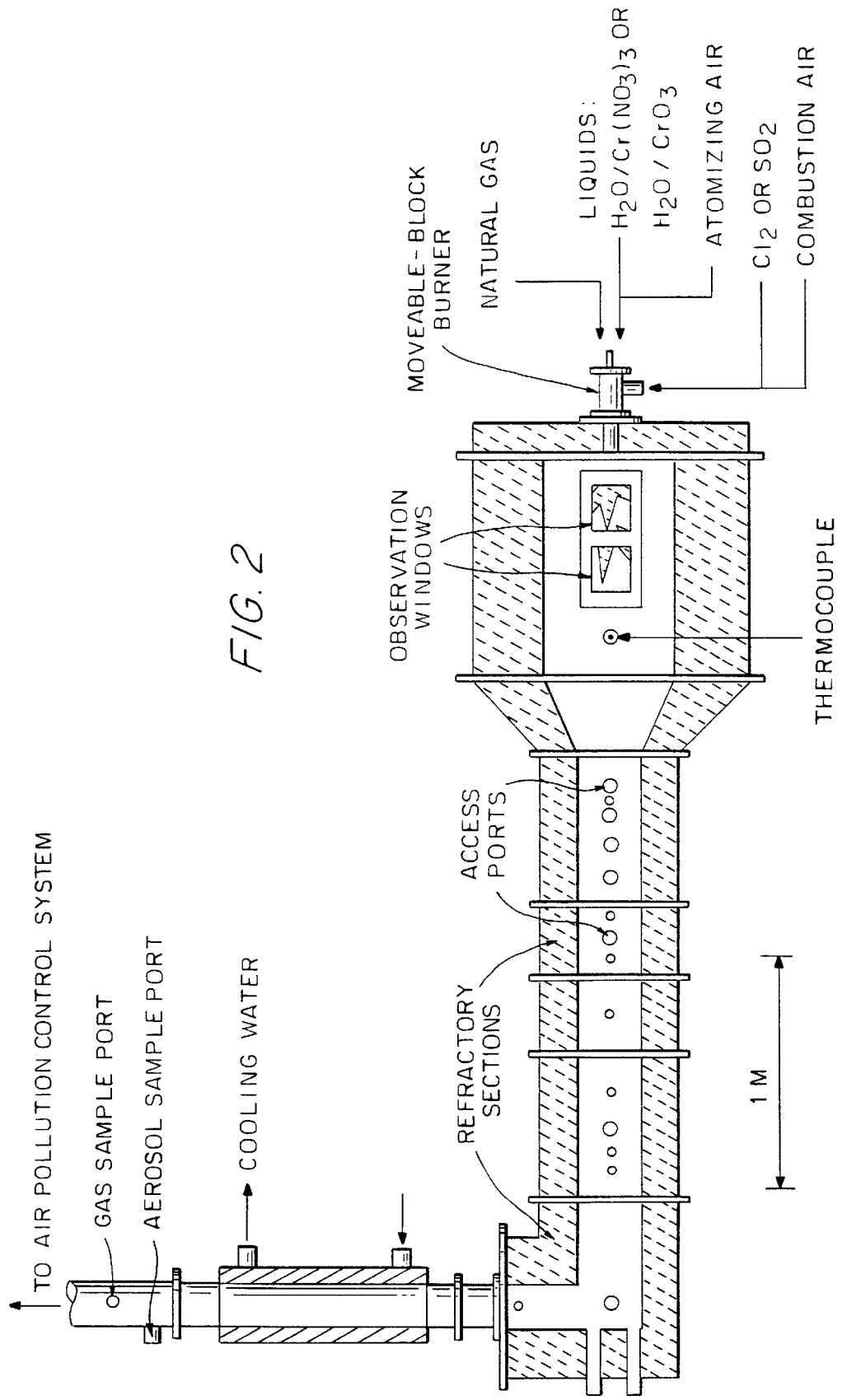
FIG. 2 shows an EPA horizontal tunnel combustor.

The experiments were performed using the laboratory-scale 82 kW (rated) horizontal tunnel combustor shown in FIG. 2. This refractory-lined research combustor was designed to simulate the time/temperature and mixing characteristics of practical industrial liquid and gas waste incineration systems. Fuel, surrogate wastes, and combustion air were introduced into the burner section through an International Flame Research Foundation (IFRF) moveable-block variable air swirl burner. Swirling air passes through the annulus around the fuel injector promoting flame stability and attachment to the water-cooled quarl. For the research results presented here, a high swirl (IFRI type 2) flame with internal recirculation (Swirl No.=1.48) was used. Axial access ports permitted temperature measurements (Linak 1994). Gaseous and aerosol samples were taken from a stack location 589.3 cm from the burner quarl. The temperature at this location was approximately 670° K (745° F.). Further details regarding the experimental combustor can be found in Linak et al., 1994, 1995, the entire contents of which are hereby incorporated by reference.

Cr(III) nitrate [Cr(NO$_3$)$_3$] or Cr(VI) oxide (CrO$_3$) were introduced as aqueous solutions through a special fuel/waste injector which incorporated a small air atomizing system down the center of a standard natural gas injector. The resulting droplet particle size distribution was relatively narrow, with a mean droplet diameter of approximately 50 $\mu$m (Linak et al., 1994). Diatomic chlorine (Cl$_2$) or SO$_2$ was introduced, separately from the metal solutions, with the (secondary) combustion air. Thus, the metal, Cl or S, was not mixed prior to its introduction into the combustor, and all interactions between the components were dependent upon normal mixing patterns.

Experiments were performed injecting aqueous solutions of Cr(NO$_3$)$_3$(III) and CrO$_3$(VI), with and without Cl$_2$ or SO$_2$, into a 59.6 kW (200,000 Btu/hr) natural gas flame. Aqueous solutions containing 1.5% (by weight) chromium were used. Solution flow rates were maintained so as to produce stack gas concentrations of approximately 100 ppm Cr (by volume). Cr(NO$_3$)$_3$(III) and CrO$_3$(VI) feed rates were 1.25 and 0.52 g/min, respectively, and correspond to constant molar feed rates of 0.005 g-moles/min. The tests were designed to introduce Cl$_2$ or SO$_2$ to maintain either a 10:1 or 100:1 molar ratio of Cl or S to metal, resulting in intended Cl or S stack concentrations of approximately 1000 and 10,000 ppm (by volume). These correspond to low chlorine, low sulfur, and low chlorine and low sulfur conditions, respectively. In practice, however, while the 10000 ppm low chlorine and low sulfur conditions were achieved (approximately), gas flows limited the high chlorine tests to approximately 6700 ppm and the high sulfur tests to between 5400 and 7900 ppm. Excess air was maintained at 15%. No air preheat was employed. Cl$_2$ or SO$_2$ gases were introduced with the combustion air. Experimental mass feed rates are shown in Table 2.

TABLE 2

Experimental Mass Feed Rates

| Fuel/oxidant species | 1/min. | g-moles/min. | |
|---|---|---|---|
| CH4 | 91.75 | 3.99 | |
| O2 ASR = 1.15 | 214.00 | 8.96 | |
| N2 ASR = 1.15 | 809.94 | 33.84 | |
| Cr (III) tests | g/min. | 5-moles/min. | Calculated stack ppm$_v$ |
| Cr(NO$_3$)$_3$ (III) | 1.25 | 0.00538 | 112 (Cr) |
| H$_2$O | 17.50 | 0.969 | — |
| Cl$_2$ (low) | 0.61 | 0.025 | 1040 (Cl) |
| SO$_2$ (low) | 1.16 | 0.052 | 1090 (S) |
| Cl$_2$ (high) | 3.79 | 0.159 | 6700 (Cl) |
| SO$_2$ (high) | 7.45 | 0.379 | 7900 (S) k1 |
| Cr (VI) tests | g/min. | g-moles/min. | Calculated stack ppm$_v$ |
| CrO$_3$ (VI) | 0.52 | 0.00518 | 112 (Cr) |
| H$_2$O | 17.50 | 0.969 | — |
| Cl$_2$ (low) | 0.61 | 0.025 | 1040 (Cl) |
| SO$_2$ (low) | 1.16 | 0.052 | 1090 (S) |
| Cl$_2$ (high) | 3.79 | 0.159 | 6700 (Cl) |
| SO$_2$ (high) | 7.45 | 0.379 | 7900 (S) |

Chromium Speciation: Sampling and Analysis

As noted above, it is difficult to measure chromium partitioning because the dominant species is a condensed species which is difficult to digest for subsequent analysis, and care must be taken to ensure that the Cr(VI) is not reduced during the sampling and analysis process.

Two sets of experiments were performed to determine factors which influenced the partitioning of chromium in the exhaust. The first set of experiments used Cr(NO$_3$)$_3$(III) as the metal waste, and investigated size segregated speciation of the exhaust aerosol. This set uncovered problems related to total chromium analysis, although the Cr(VI) analyses were sound. The first set, therefore, provides data on what fraction of the Cr(VI) consists of vapor-phase species and submicron particles, compared to supermicron particles [with Cr(NO$_3$)$_3$(III) as the waste feed], although it was unable to determine the Cr(VI)/total Cr partitioning. The second set of experiments was conducted after the total chromium analytical problem was solved, so that the Cr(VI)/total Cr partitioning was addressed for both Cr(NO$_3$)$_3$ and CrO$_3$ waste feeds. Data from this set comprise all the speciation data obtained. Size segregated speciation data, however, were not obtained from this data set since a different sampling protocol (EPA draft Method 0013, 1990) was used rather than a dilution probe and cascade impactor system (Linak et al., 1994). Draft Method 0013 does not provide for particle size classification.

The first set of experiments shown in Table 2 included baseline (no Cl; no S, low Cl; high Cl, low S; and high S conditions with Cr(NO$_3$)$_3$(III) as the waste feed. The exhaust aerosol was sampled with a dilution probe (Linak et al., 1994), and size segregated into two fractions using a modified Andersen cascade impactor. Particles greater than approximately 1.1 $\mu$m diameter were collected on 81 mm quartz fiber filter substrates on three impactor stages, and subsequently frozen to prevent the reduction of collected Cr(VI). Vapor-phase species and particles less than approximately 1.1 $\mu$m in diameter passed through the impactor and were directed to two impingers, each containing 100 ml of a 0.5 N potassium hydroxide solution, following the stabilizing approach of EPA Draft Method 0013 (1990). (Samples were collected at a nominal flow rate of 1 scfm (28.3 sL/min.). Nominal test duration was 45 minutes. Following sample collection, the impinger contents were weighted, the alkaline pH verified, and the contents were transferred to clean, amber glass sample jars. The impingers and connecting glassware were rinsed with deionized water and the rinsates combined with the impinger smaple. The impingers and connecting glassware were then rinsed again with 0.1 N nitric acid, and this rinsate was collected in separate sample jars. The sample jars were kept refrigerated until submitted for analysis.

The samples were analyzed for both Cr(VI) and total Cr. Cr(VI) analyses were performed using ion chromatography with a post-column reactor and a visible wavelength detector, as described in the Method Manual for Compliance with BIF Regulations (Draft Method 0013, 1990). The three particle filters (impactor stages) were combined and leached with 50 ml of 0.1 KOH for two hours. The extract was brought to a volume of 50 ml. Except for the determination of total sample volumes, no further preparation of the impinger samples was required. An aliquot of each caustic impinger solution and caustic filter (impactor) extract was then analyzed for Cr(VI) by ion chromatography with a post-column reactor.

These same sample fractions were also analyzed for total chromium by graphite furnace atomic absorption (GFAA) spectrometry. Prior to analysis, aliquots of the samples were acid digested using concentrated HNO$_3$. This procedure was intended both to reduce the Cr(VI) species and to solubilize other chromium species. Each aliquot was concentrated to near dryness using a hot plate. Next, 10 ml of concentrated HNO$_3$ was added, and the samples were further concentrated to approximately 5 ml. The acid impinger rinsates were also acid digested and analyzed separately. The concentrates were then filtered, brought to a volume of 50 ml, and analyzed by GFAA>

These tests failed to yield satisfactory total chromium mass balance closure. Comparison of measured chromium emissions to theoretical emissions demonstrated unacceptable recoveries, typically less than 1%. Possible problem areas included poor chromium atomization through the burner, loss of chromium to refractory and combustor surfaces, sampling errors, and unknown analytical interferences, including incomplete sample digestion. The last-mentioned was a prime suspect for the major portion of the discrepancy, since the filtrates were observed after supposed digestion with concentrated $HNO_3$.

Sample digestion was further investigated using a smaple of analytical grade $Cr_2O_3(III)$. The appearance of this material was virtually identical to that of the $HNO_3$ filtrates. Two alternative digestion procedures were evaluated prior to the analysis of the second set of flue gas samples. The first method evaluated the hydrofluoric acid (HF) digestion procedure used to digest filter samples collected by draft Method 29 (1990). The second method was a caustic fusion technique.

For the hydrofluoric acid digestion procedure, 150 mg of analytical grade $Cr_2O_3(III)$, which is approximately equal to the mass to total chromium calculated to be present in the stack gas samples, 6 ml of concentrated $HNO_3$, and 4 ml of concentrated HF were placed into a microwave pressure relief vessel. Each sample was heated for 15 minutes in 2 minute intervals at 600 W, diluted to 200 ml in a volumetric flask, and analyzed by GFAA as described above. Digestion efficiencies of 44 and 72% were observed for the duplicate samples, respectively.

For the caustic fusion procedure, approximately 50 mg of $Cr_2O_3(III)$ was placed into a graphite crucible and fused with 1 gram of sodium nitrate and 3 grams of sodium hydroxide in a muffle furnace. During fusion, the crucible and contents were heated over a four hour period from 250 to 410° C. with one hour stops at 350 and 390° C. Upon cooling, the sample was dissolved in approximately 60 ml of deionized water over a hot plate and then diluted to 100 ml in a volumetric flask with 2 ml of concentrated $HNO_3$ added. The digested samples were analyzed by GFAA as described above. Digestion efficiencies of 75, 87 and 91% were observed for the triplicate samples, respectively. Based upon these measured digestion efficiencies, the caustic fusion technique was selected for determining total chromium.

The second set of combustion experiments, which focused on chromium speciation, strictly followed guidelines outlined in draft Method 0013 (1990), the entire contents of which are hereby incorporated by reference. Unfortunately, draft Method 0013 includes a caustic solution quench within a quartz sampling probe and, thus, does not allow for size segregation of the collected sample. However, it should be noted that, once Cr(VI) was determined using the draft Method 0013 analytical procedure, the samples were redigested using the caustic fusion procedure and analyzed for total chromium. This involved concentrating the caustic solutions to near dryness on a hot plate and then following the caustic fusion procedure outlined above.

While analytical recoveries using the caustic fusion method were high, typical chromium recovery mass balances through the combustor ranged from 25 to 30%. It was noted that the chromium feed streams were difficult to atomize and often formed growing appendages on the injection nozzle, and this would account for significant mass loss. In addition there may have been losses to the refractory walls.

Aerosol Particle Size Distribution: Sampling and Analysis

Particle size distribution measurements were taken from the stack using an Andersen eight stage, 28.3 L/min. (1 $ft^3$/min.), atmospheric pressure cascade impactor and a TSI differential mobility particle sizer (Linak et al., 1994). The cascade impactor was designed to collect physical samples for subsequent gravimetric and/or chemical analysis on nine stages, including the afterfilter, less than approximately 10 $\mu$m in diameter. The differential mobility particle sizer classifies and counts particles within a working range of 0.001 to 1.0 $\mu$m diameter using principles of electrical mobility. The differential mobility particle sizer was configured to yield 27 channel evenly spaced logarithmically over this range.

Cascade impactor and differential mobility particle sizer samples were taken using a two-stage isokinetic aerosol sampling system based on the modified designs of Scotto (1992). Detailed discussion of this operation is presented in Linak et al., 1994. In order to minimize in-probe gas and aerosol kinetics, the sampling system dilutes and cools the aerosol sample using filtered nitrogen and air immediately after sampling. Calculated dilution ratios and sampling probe residence times are approximately 10:1 and 0.2 s, and 400:1 and 2.5 s for the impactor and differential mobility particle sizer, respectively. Dilution ratios were measured directly for each experiment and verified independently by the measurement of a nitric oxide tracer gas.

Results

Three types of data were obtained. First, the overall Cr(VI) fraction of the total Cr in the exhaust was measured as a function of initial chromium valence [Cr(III) or Cr(VI)], and Cl and S concentration. These data resulted from use of the draft Method 0013 sampling and analytical protocol for Cr(VI), and subsequent redigestion of the samples using the caustic fusion method. Second, the size segregated distribution of Cr(VI) in the exhaust was explored for the Cr(III) waste feed, with and without Cl and S. Third, differential mobility particle sizer and impactor measurements investigated how Cr speciation [$Cr(NO_3)_3(III)$ or $CrO_3(VI)$] in the feed, influences the exhaust aerosol particle size distribution.

Cr(VI) Total Partitioning

The bar graphs in FIG. 3 depict the overall partitioning between Cr(VI) and total Cr. In the upper panel, FIG. 3a, chromium partitioning results from the introduction of $Cr(NO_3)_3(III)$ in aqueous solution are presented. With neither Cl nor S present, approximately 2% of the total chromium in the stack gas effluent is hexavalent. The addition of 1000 ppm (low) chlorine increased the percent of Cr(VI) in the exhaust slightly, to 2.5%. The addition of 6700 ppm chlorine (high) raised the Cr(VI) percentage in the exhaust to approximately 8%. The addition of sulfur with no chlorine present sharply diminished the emission of Cr(VI). In fact, with a high concentration of sulfur, approximately 7900 ppm, the Cr(VI) percentage was reduced to near detection levels. The differences in Cr(VI)/total Cr shown in FIG. 3 are due primarily to large differences in the absolute amounts of Cr(VI) measured, rather than to differences in total chromium measured. Thus, it is unlikely that these results are corrupted by sample digestion difficulties.

The trends exhibited in FIG. 3a are consistent with equilibrium predictions, although the absolute values are not. In the absence of both chlorine and sulfur, some Cr(VI) which is stable at higher temperature appears to persist through to the lower temperature regime, even though equilibrium would not predict its presence there. High chlorine concentrations sharply enhanced Cr(VI) emissions, possibly due to $CrCl_6$ which was predicted to be stable at low temperatures. The effect of sulfur is consistent with equilibrium if it is assumed that conversion of Cr to $Cr_2(SO_4)_3$ is rapid. It is interesting that equilibrium predicts that even relatively small quantities of sulfur can counteract the Cr(VI) formation tendencies of chlorine.

In FIG. 3b, analogous results are presented for $CrO_3$(VI) waste feed. It is significant that they are very similar to the results presented in FIG. 3a with Cr(III) waste feed. The partitioning of chromium in a combustor thus seems to be independent of the initial valence of chromium waste feed. Most of the Cr(VI) that entered was converted to Cr(III). The similarity in partitioning between FIGS. 3a and 3b, and the fact that the final Cr(VI)/total Cr partitioning is independent of initial speciation, suggest that, prior to sampling, some type of equilibrium controlled mechanism, with neither kinetic nor mixing limitations, is operable. However, the low conversion to Cr(VI) in the presence of chlorine, and the finite conversion in the absence of chlorine and sulfur, suggest that this equilibrium is "frozen" at a temperature higher than the sampling or exhaust temperature.

Size Segregated Cr(VI) Distribution

Also shown in FIG. 3a is the fraction of the Cr(VI) found on particles larger than approximately 1.1 $\mu$m in diameter, and the fraction found as vapor or on particles less than that size. Of interest was how the size segregation of Cr(VI) varied with the presence of chlorine and sulfur, for a given Cr waste [$Cr(NO_3)_3$]. These fractions were actually obtained from experiments where total chromium was not measured, and were assumed to be valid when applied to the other experiments where total chromium was determined for the same waste and acid gas conditions. They could thus be included on FIG. 3a as shown. Cr(VI) mass greater than 1.1 $\mu$m in diameter was analyzed from particles found on impactor filter substrates. Cr(VI) mass less than 1.1 $\mu$m in diameter passes through the impactor into the caustic impinger solutions. For the base case, with no acid gas, most of the Cr(VI) was associated with the larger particles. With chlorine, a larger fraction (approximately 70%) was found in the submicron particle size range. The latter result is consistent with the high volatility of $CrCl_6$, and has implications from a health effects perspective.

Particle Size Distributions

Figure 4A:
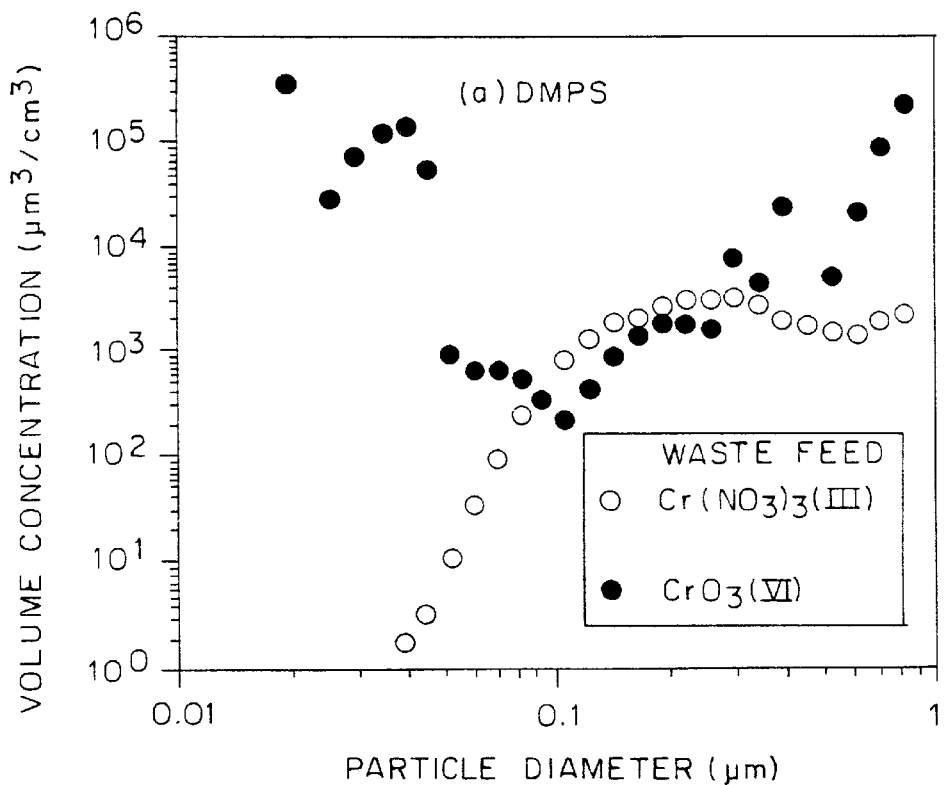
FIG. 4a shows DMPS submicron volume distribution for $Cr(NO_3)_3$(III) and $CrO_3$(VI) waste feed.
Figure 4B:
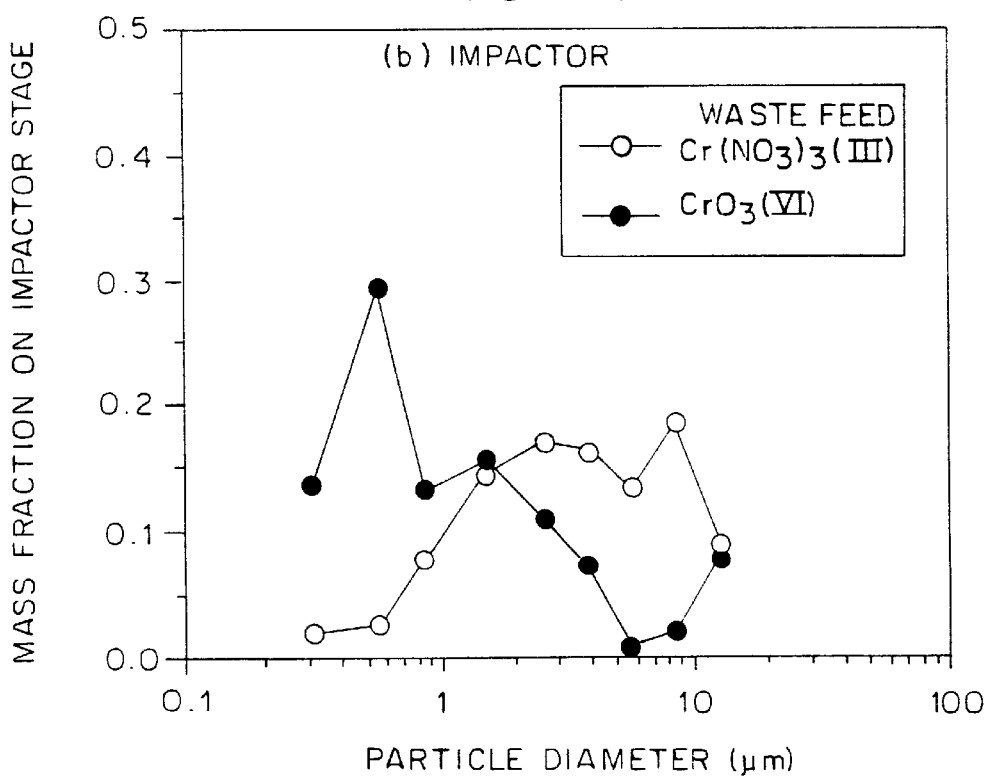
FIG. 4b shows impactor mass fraction distribution for $Cr(NO_3)_3$(III) and $CrO_3$(VI) waste feed.

FIG. 4 shows the differential mobility particle sizer and impactor particle size distribution for the exhaust aerosol for the $Cr(NO_3)_3$(III) and $CrO_3$ waste feeds. There was no added chlorine or sulfur. For $Cr(NO_3)_3$ (open circles), the base case particle size distributions indicate relatively low volume concentration of submicron particles (approximately $10^3$ $\mu m^3/cm^3$), with the majority of the aerosol mass evenly distributed in particle sizes between 2 and 10 $\mu$m in diameter. When CrO3(VI) is used as the waste feed (shaded circles), the submicron volume concentrations are notably higher than those for the $Cr(NO_3)_3$(III) waste feed ($10^5$ vs $10^3$ $\mu m^3/cm^3$). Also, well defined submicron nuclei modes (0.04–0.05 $\mu$m) were seen for $CrO_3$ only. These data are also consistent with the impactor data. These results, combined with the Cr(VI) partitioning data presented in FIG. 3, suggest that the mechanisms which control Cr(VI) partitioning and Cr particle size differentiation are different. Chemical analyses (FIG. 3) suggest that the original valence of the chromium waste does not influence the resultant Cr(VI)/total Cr partitioning, and that this behavior is consistent with thermodynamic predictions. However, the particle size distribution data indicate that the original chromium speciation strongly influences the resultant particle size distribution. A possible explanation is that the chromium speciation chemistry is indeed equilibrium controlled, while the aerosol dynamics are dependent on physical transformations which might occur during waste atomization.

For high temperature, highly turbulent gas-phase incinerator conditions, the relative ratio of Cr(VI)/total Cr in unaffected by the initial Cr valence of the waste, and ranges from near zero to approximately 8%, depending on the presence of chlorine or sulfur in the waste feed. Comparison of the equilibrium predictions and Cr(VI)/total Cr partitioning data suggest that some type of equilibrium controlled mechanism, with neither kinetic nor mixing limitations, may control the partitioning of Cr species in these types of incineration environments. Equilibrium predictions suggest that, although some Cr(VI) species are stable at high temperatures, they are not favored at low temperatures in the absence of chlorine. Data show that, without available chlorine, not more than 2% of the total chromium exists as Cr(VI). When chlorine is added, the equilibrium predicts Cr(VI) species to be favored at stack conditions, and the data indicate that Cr(VI) species increase to between 5 and 8% of the total chromium measured. The equilibrium prediction and data also indicate that the presence of sulfur greatly inhibits the formation of Cr(VI) species. With addition of sulfur, the data indicate that less than 0.5% of the total chromium is partitioned to Cr(IV) species. Equilibrium also predicts that relatively small amounts of sulfur inhibit the formation of Cr(VI) species even in the presence of large amounts of chlorine. However, the low conversion of Cr(VI) in the presence of chlorine, and the finite conversion in the absence of chlorine and sulfur, suggests that this equilibrium is "frozen" at a temperature higher than the sampling or exhaust temperature. In contrast to the chemical analysis, particle size distribution measurements indicate that the initial form of the chromium waste does influence the resultant particle size distribution. This mechanism is not well understood. A possible explanation is that the chromium speciation chemistry is equilibrium controlled, while the particle size distribution is determined by the aerosol dynamics which are dependent on physical transformation.

The partitioning of nickel and chromium in combustion systems was investigated both theoretically and experimentally. Nickel and chromium are both considered to be refractory (non-volatile) metals, and theoretical predictions based on chemical equilibrium confirmed that trivalent nickel and hexavalent chromium remained relatively non-volatile under baseline combustion conditions. Chlorine, however, was predicted to increase the volatility of nickel at high temperatures due to the formation of volatile nickel-chloride compounds. Chlorine's predicted effect on chromium volatility at high temperatures was minimal, although some volatile chromium-chloride compounds were predicted at low temperatures.

Experimental studies employed a 59 kW laboratory scale combustor, shown in FIG. 2, with a swirling natural gas diffusion flame through which aqueous nickel and chromium solutions were sprayed. Particle size distributions were measured by three different techniques: electrical mobility and inertial impaction for sampled aerosols, and light scattering for in situ stack analyses. All three methods produced consistent particle size distributions. Experimental data for nickel were also consistent with the theoretical predictions, and confirmed the large increase in nickel volatility due to chlorine. Also consistent with predictions, data for both trivalent and hexavalent chromium did not indicate notable increases in volatility due to chlorine addition. However, introducing hexavalent chromium in the feed produced smaller chromium particles in the exhaust than did trivalent chromium. Experimental evidence suggested that, contrary to equilibrium predictions, hexavalent chromium vaporized in the flame while trivalent chromium did not. Speciation of chromium in the exhaust, however, was independent of the initial chromium valency, with exhaust values of hexavalent chromium typically less than 1% of the total chromium measured. Based on color and solubility, a large fraction of the sampled chromium was believed to be $Cr_2O_3(III)$. The hexavalent chromium fraction in the exhaust was enhanced slightly by chlorine, but reduced to below analytical detection limits by the addition of small (stoichiometric) quantities of sulfur.

Once nickel was vaporized by chlorine, the nickel was readily scavenged by an alumino-silicate sorbent such as kaolinite. However, kaolinite had no effect on the particle size distribution of non-volatile nickel (without chlorine), and both kaolinite and hydrated lime had no effect on the particle size distributions for chromium, whether it vaporized or not (with and without chlorine, trivalent and hexavalent).

Theoretical Equilibrium Considerations

Multicomponent equilibrium calculations provide insight into which species are thermodynamically stable at flame and flue gas temperatures. As always, the accuracy of equilibrium results depends on the accuracy of the thermodynamic data available, and on the availability of thermodynamic data for all important species containing the elements in question. In addition, equilibrium calculations do not take into account kinetic or mixing limitations and, therefore, represent an idealized solution that may not be realized in practical systems. Thermochemical predication were determined using the CET89 computer code for calculating complex chemical equilibrium (Gordon and McBride, 1986). Table 3 lists the metal species considered in these calculations, together with the appropriate references. Of interest is the thermodynamic partitioning between vapor and condensed phases, as well as the partitioning between various species. Also, of special interest for chromium is the partitioning between hexavalent chromium and other chromium valent species (cf. Linak, 1996). For both nickel and chromium, the influences of chlorine, sulfur, and both chlorine and sulfur were investigated. The conditions are summarized in Table 4. These conditions represented combustion of natural gas at a stoichiometric ratio of 1.2, with aqueous metal solutions injected to produce approximately 100 ppm metal in the exhaust. The effects of excess chlorine (2500 ppm) and excess sulfur (2500 ppm) with respect to the metal are shown.

TABLE 3

Nickel and Chromium Species Considered for Equilibrium Calculations

| Species without Chlorine or Sulfur | | Additional Species with Chlorine | | Additional Species with Sulfur | |
| --- | --- | --- | --- | --- | --- |
| Ni Species | Reference | Ni Species | Reference | Ni Species | Reference |
| Ni | J12/76 | NiCl | J9/77 | NiS | J12/76 |
| NiO | L2/84 | $NiCl_2$ | IB93 | NiS (a) | J12/76 |
| $Ni(CO)_4$ | IB89 | $NiCl_2$ (s) | IB93 | NiS (b) | J12/76 |
| $NiO_2H_2$ | L3/84 | $NiCl_2$ (l) | IB93 | NiS (l) | J12/76 |
| Ni (s) | J12/76 | | | $NiS_2$ (s) | J3/77 |
| Ni (l) | J12/76 | | | $NiS_2$ (l) | J3/77 |
| $Ni_3C$ (s) | B5/89 | | | $Ni_3S_2$ (I) | J12/76 |
| $NiCO_3$ (s) | B5/89 | | | $Ni_3S_2$ (II) | J12/76 |
| NiO (1) | BAR73 | | | $Ni_3S_2$ (l) | J12/76 |
| NiO (2) | BAR73 | | | $Ni_3S_4$ (s) | J3/77 |
| NiO (3) | BAR73 | | | $NiSO_4$ (s) | IB93 |

TABLE 3-continued

| Cr Species | Reference | Cr Species | Reference | Cr Species | Reference |
| --- | --- | --- | --- | --- | --- |
| Cr | J6/73 | CrCl | BE95 | CrS (1) | IB77 |
| CrN | J12/73 | $CrCl_2$ | BE95 | CrS (2) | IB77 |
| CrO | J12/73 | CrOCl | BE95 | $Cr_2(SO_4)_3$ (s) | IB89 |
| CrOH | BE93 | $CrCl_3$ | BE95 | | |
| $CrO_2$ | J12/73 | $CrOCl_2$ | BE95 | | |
| CrOOH | BE93 | $CrCl_4$ | BE95 | | |
| $Cr(OH)_2$ | BE93 | $CrO_2Cl$ | BE95 | | |
| $CrO_3$ | J12/73 | $CrOCl_3$ | BE95 | | |
| $CrO_2OH$ | BE93 | $CrCl_5$ | BE95 | | |
| $Cr(OH)_3$ | BE93 | $CrO_2Cl_2$ | BE95 | | |
| $CrO(OH)_3$ | BE95 | $CrOCl_4$ | BE95 | | |
| $CrO(OH)_2$ | BE93 | $CrCl_6$ | BE95 | | |
| $CrO_2(OH)_2$ | BE93 | $CrCl_2$ (s) | IB89 | | |
| $Cr(OH)_4$ | BE93 | $CrCl_2$ (l) | IB89 | | |
| $CrO(OH)_4$ | BE93 | $CrCl_3$ (s) | | | |
| $Cr(OH)_5$ | BE93 | | | | |
| $Cr(OH)_6$ | J6/73 | | | | |
| Cr (s) | J6/73 | | | | |
| Cr (l) | IB89 | | | | |
| $Cr_7C_3$ (s) | IB93 | | | | |
| $Cr_3C_2$ (s) | IB89 | | | | |
| $Cr_{23}C_6$ (s) | IB89 | | | | |
| $Cr(CO)_6$ (s) | J12/73 | | | | |
| CrN (s) | J12/73 | | | | |
| $Cr_2N$ (s) | IB89 | | | | |
| $CrO_2$ (s) | IB89 | | | | |
| $CrO_3$ (s) | IB89 | | | | |
| $CrO_3$ (l) | J12/73 | | | | |
| $Cr_2O_3$ (s) | J12/73 | | | | |
| $Cr_2O_3$ (l) | | | | | |

J6/73: JANAF 6/73 - Chase (1986)
J12/73: JANAF 12/73 - Chase (1986)
J12/76: JANAF 12/76 - Chase (1986)
J3/77: JANAF 3/77 - Chase (1986)
J9/77: JANAF 9/77 - Chase (1986)
L2/84: Lewis 2/84 - McBride et al (1993)
L3/84: Lewis 3/84 - McBride et al (1993)
BE83 - Ebbinghaus (1993)
BE95 - Ebbinghaus (1995)
BAR73 - Barin (1973)
IB77 - Barin (1977)
IB89 - Barin (1989)
IB93 - Barin (1993)

TABLE 4

Nominal Experimental Mass Feed Rates

| Fuel/Oxidant Species | Feed Rate | g-moles/min |
| --- | --- | --- |
| $CH_4$ | 86.09 L/min | 3.74 |
| $O_2$ @ SR = 1.2 | 209.91 L/min | 8.75 |
| $N_2$ @ SR = 1.2 | 789.67 L/min | 32.79 |

| Cr (III) Tests | Feed Rate | g-moles/min | Calculated Stack $ppm_v$ |
| --- | --- | --- | --- |
| $Cr(NO_3)_3$ (III) | 1.26 g/min | 0.0053 | 115 (Cr) |
| $H_2O$ | 17.11 g/min | 0.95 | — |
| $Cl_2$ | 0.61 L/min | 0.027 | 1180 (Cl) |
| | 1.52 L/min | 0.68 | 2930 (Cl) |
| $SO_2$ | 1.16 L/min | 0.052 | 1120 (S) |
| | 2.90 L/min | 0.13 | 2800 (S) |

| Cr (VI) Tests | Feed Rate | g-moles/min | Calculated Stack $ppm_v$ |
| --- | --- | --- | --- |
| $CrO_3$ (VI) | 0.52 g/min | 0.0052 | 112 (Cr) |
| $H_2O$ | 17.27 g/min | 0.96 | — |
| $Cl_2$ | 0.61 L/min | 0.027 | 1180 (Cl) |
| | 1.52 L/min | 0.068 | 2930 (Cl) |
| $SO_2$ | 0.087 L/min | 0.0039 | 84 (S) |
| | 0.29 L/min | 0.013 | 280 (S) |

TABLE 4-continued

|  | 1.15 L/min | 0.052 | 1120 (S) |
|  | 2.90 L/min | 0.13 | 2800 (S) |

| NI Tests | Feed Rate | g-moles/min | Calculated Stack ppm$_v$ |
| --- | --- | --- | --- |
| Ni(NO$_3$)$_2$ | 0.91 g/min | 0.0049 | 108 (Ni) |
| H$_2$O | 17.50 g/min | 0.97 | — |
| Cl$_2$ | 0.52 L/min | 0.024 | 1000 (Cl) |

Figure 5A:
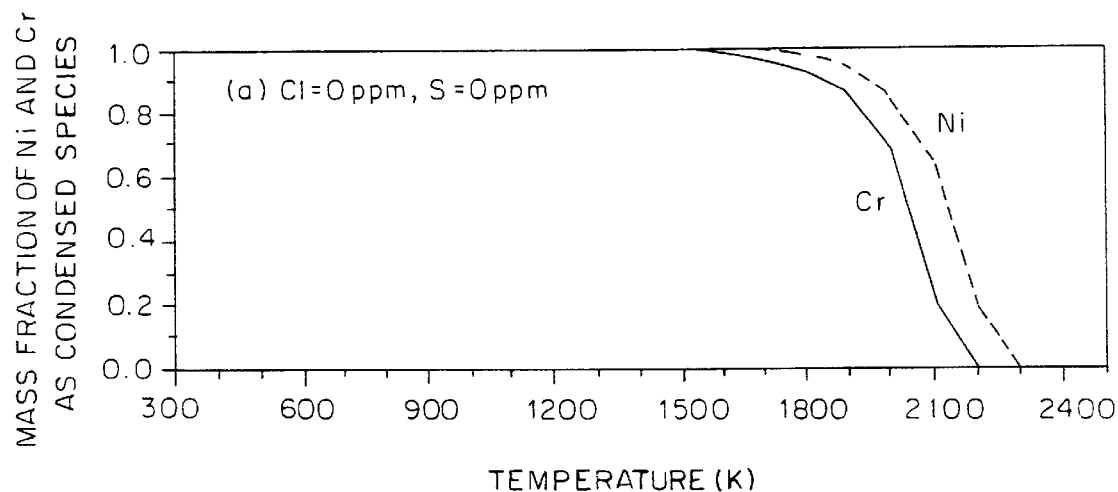
FIG. 5a shows 0 ppm chlorine, 0 ppm sulfur.
Figure 5B:
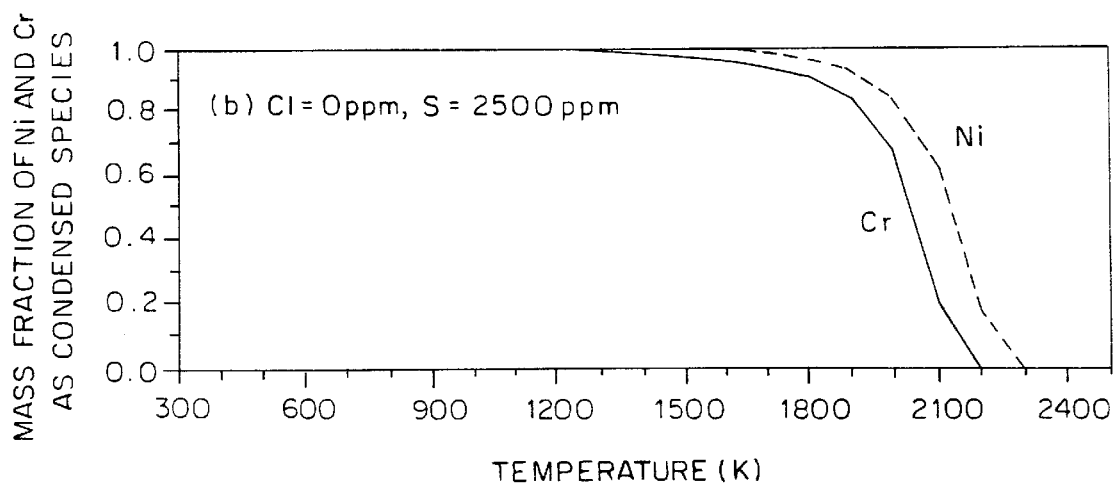

Equilibrium predictions, shown in FIG. 5a, indicate that both metals are refractory, with dewpoints of 2000 and 1900° K for 100 ppm nickel and chromium, respectively. Chlorine addition, shown in FIG. 5b, lowers the nickel dewpoint by approximately 200° K and moves the nickel curve from the right to the left of the chromium curve, which shows no significant effect of chlorine. The fact that chlorine is more likely to devolatilize nickel than chromium at high temperatures suggests that, in the presence of chlorine, high temperature sorbents may capture nickel, but are less likely to capture chromium.

Figure 5C:
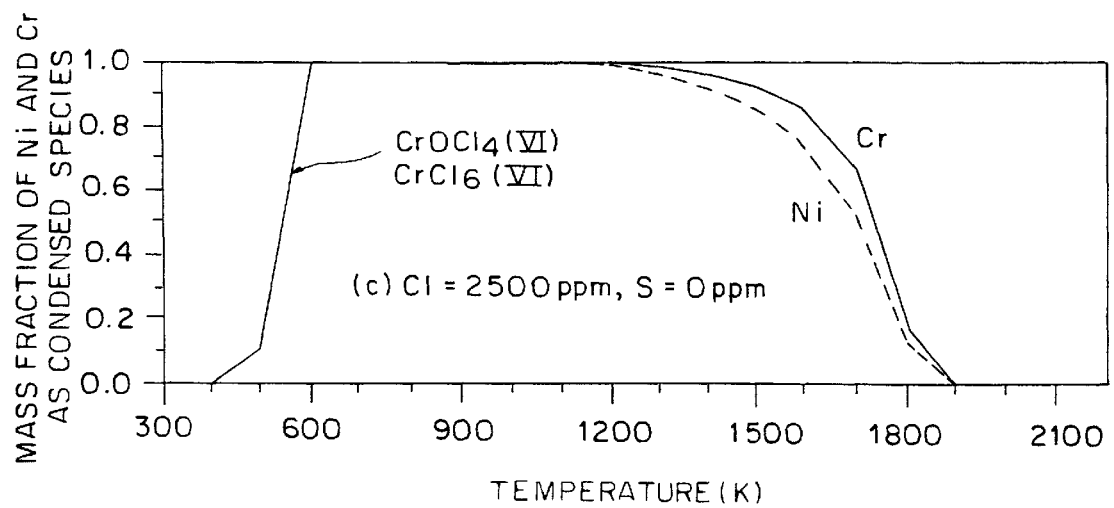

At low temperatures nickel and chlorine are predicted to form a condensed nickel chloride salt, thus rendering the residue water soluble. However, chlorine's predicted effect on chromium at low temperatures is profound. Not only is chromium predicted to form vapor-phase chromium chloride, but it is also predicted to form the hexavalent chromium chlorides, CrOCl$_4$(VI) and CrCl$_6$(VI), as shown in FIG. 5c. The presence of sulfur, shown in FIG. 5d, completely eliminated the chlorine-enhanced formation of low temperature hexavalent chromium species, but had little effect on the high-temperature hexavalent chromium species (Linak et al., 1996). This is because sulfur ties up chromium to form trivalent chromium sulfate, but only at low temperatures.

The effect of sulfur on the nickel-chlorine mixture is quite predictable. It has no effect at high temperatures on the devolatilization of nickel, since nickel sulfates are unstable at high temperatures. However, the effect of sulfur at low temperatures is merely to replace a solid nickel chloride by a solid nickel sulfate. Additional calculations exploring the equilibrium effects of calcium addition showed that calcium, even at concentrations in excess with respect to sulfur, displaced neither the nickel sulfate nor the chromium sulfate and, therefore, had no appreciable effect on nickel or chromium partitioning.

Laboratory Swirl Flame Combustor

Experiments were performed using the laboratory scale 59 kW (actual), 82 kW (maximum rated) horizontal tunnel combustor shown in FIG. 2. This refractory-lined research combustor was designed to simulate the time/temperature and mixing characteristics of practical industrial liquid and gas combustion systems. Natural gas fuel, aqueous metal solutions, gas dopants, and combustion air were introduced into the burner section through an International Flame Research Foundation (IFRF) movable-block variable air swirl burner. This burner incorporates an interchangeable injector promoting flame stability and attachment to the water-cooled quail. A high swirl (IFRF type 2) flame with internal recirculation (Swirl No.=1.48) was used. Gaseous and aerosol samples were taken from a stack location 5.9 meters form the burner quail. The temperatures at this location was approximately 670° K (745° F.). Further details regarding the experimental ombustor are given in Linak et al., 1994, 1995, 1996.

Metal Systems Investigated

Nickel nitrate [Ni(NO$_3$)$_2$], chromium(III) nitrate [Cr(NO$_3$)$_3$(III)], or Cr(VI) oxide [CrO$_3$(VI)] were introduced as aqueous solutions through a special fuel/waste injector which incorporated a small air atomizing system down the center of a standard natural gas injector. The resulting droplet particle size distribution was relatively narrow, with a mean droplet diameter of approximately 50–80 microns (Linak et al., 1994). Diatomic chlorine (Cl$_2$) or SO$_2$ dopants were introduced separately from the metal solutions with the (secondary) combustion air. Thus, the metal and the chlorine or sulfur were not mixed prior to their introduction into the combustor. All interactions between the components were dependent upon normal turbulent mixing patterns.

Aqueous solutions containing 1.5% by weight of nickel or chromium were used. Solution flow rates were maintained so as to produce stack gas concentrations of approximately 100 ppm metal by volume. Metal feed rates shown in Table 4 correspond to constant molar feed rates of approximately 0.005 g-moles/min. Several tests were performed to introduce Cl$_2$ or SO$_2$ at different molar ratios of chlorine or sulfur to metal. These feed rates and resulting stack concentrations are also shown in Table 4. Excess air was maintained at 20%. No air preheat was employed.

Chromium Speciation: Sampling and Analysis

In contrast to nickel, analytical measurement of total chromium and hexavalent chromium was particularly difficult for two reasons. First, the likely dominant chromium species [Cr$_2$O$_3$(s)] is extremely difficult to digest for subsequent analysis. Second, if valency information is desired, care must be taken to ensure that hexavalent chromium is not reduced during the sampling and analysis process. This is usually accomplished by keeping the sample in contact with an alkaline environment at all times. The converse problem of chromium oxidation to Cr(VI) species is not an issue at room temperatures (Seigneur and Constantinou, 1995).

Chromium samples were analyzed for both Cr(VI) and total chromium. Cr(VI) analyses were performed using ion chromatography with a post-column reactor and a visible wavelength detector as described in the Method Manual for compliance with BIFF Regulations (EPA Method 00612, 1990). These same samples were also analyzed for total chromium by a caustic fusion procedure. In this method, the sample filtrate was placed into a graphite crucible and "fused" with one gram of sodium nitrate and three grams of sodium hydroxide in a muffle furnace. During fusion, the crucible and contents were heated over a four-hour period from 250–410° C. with one hour stops at 350 and 390° C. Upon cooling, the sample was dissolved in approximately 60 mL of deionized water over a hot plate and then diluted to 100 mL in a volumetric flask with 2 mL of concentrated nitric acid added. The digested samples were analyzed by graphite furnace atomic absorption. This method produced notably improved digestion efficiencies (75, 87 and 91%) compared to the hydrofluoric acid digestion efficiencies (4 and 72%) outlined in the EPA Method 0060 (1990) procedures.

Aerosol Particle Size Distribution: Sampling and Analysis

Particle size distribution measurements were taken from the stack location using three techniques. Extractive samples were taken for collection by inertial impaction and electrical mobility analyses using an isokinetic aerosol sampling system based on the modified designs of Scotto et al. (1992) and Linak et al. (1994). In order to minimize in-probe gas and aerosol kinetics, the sampling system dilutes and cools the aerosol sample using filtered nitrogen and air immediately after sampling. Dilution ratios were measured directly for each experiment and verified independently by measuring a nitric oxide tracer gas.

Extracted samples were directed to an Andersen, Inc. eight stage, 28.3 L/min. (1 ft$^3$/min.) atmospheric pressure cascade impactor and a Thermo-Systems Inc. scanning mobility particle sizer. The cascade impactor is designed to collect physical samples for subsequent gravimetric and/or chemical analysis on nine stages, including the afterfilter, which are less than approximately 10 microns diameter. The scanning mobility particle sizer classifies and counts particles within a working range of 0.01 to 1.0 micron diameter using the principles of charged particle mobility through an electric field. The scanning mobility particle sizer, used throughout the chromium experiments, is an ungraded version of the differential mobility particle sizer used for the nickel experiments. The scanning mobility particle sizer upgrade allows for improved particle size distribution resolution and shorter sampling times. The scanning mobility particle sizer and differential mobility particle sizer were configured to yield 54 and 27 channels, respectively, evenly spaced (logarithmically) over the 0.01 to 1.0 micron diameter range.

In addition to the inertial impaction and electrical mobility devices which require an extracted sample, limited in situ light scattering particle size diameters were taken using an Insited Inc. laser doppler velocitmeter. This instrument determines particle size by measuring the light scatter intensity of particles which pass through a sampling volume established within the combustor stack by a laser focused through a set of quartz optical access ports. The working range of this device was appropriately 0.2 to 30 micron diameter, which slightly overlapped and extended the particle size data collected by the scanning mobility particle sizer.

In addition to the three particle size diameter instruments, samples were collected on silver filters and analyzed using a field emission scanning electron microscope equipped with an energy dispersive X-ray spectrometer. This provided morphological information as well as qualitative chemical analysis of individual particles.

Particle Size Distributions without Chlorine

FIG. 6 represents the particle size distributions for nickel, injected as Ni(NO$_3$)$_2$, for Cr(III), injected as Cr(NO$_3$)$_3$(III), and for Cr(VI), injected as CrO$_3$(VI). As described above, these aqueous solutions were injected through a natural gas diffusion flame operated at 20% excess oxygen (SR=1.2). These data (open symbols) were obtained using the scanning mobility particle sizer for particles in the 0.01 to 1.0 micron diameter size range and the in situ light scattering particle sizer for particles in the 0.3 to >10 micron diameter size range. Each point also shows the effect of chlorine addition (shaded symbols), where the chlorine was added as Cl$_2$ gas along with the secondary combustion air.

FIG. 7 shows the results of gravimetric analyses of masses collected on the eight stages and after filter of the cascade impactor. The mass fraction of the metal collected is plotted versus particle diameter. The particle diameter denoted by the abscissa value at the left side of each bar is that particle diameter at which 50% of the particles are not collected by the impactor plate in question (50% cutoff diameter). All particle sizes in FIG. 7 have been corrected for particle density effects.

It should be noted that all three methods of particle collection and sizing produced consistent results that supported each other. Data from the in situ light scattering particle sizer slightly overlapped and extended the range of the scanning mobility particle sizer for the sampled particles. This suggests that the isokinetic dilution sampling procedure used maintained aerosol size integrity.

Figure 6A:
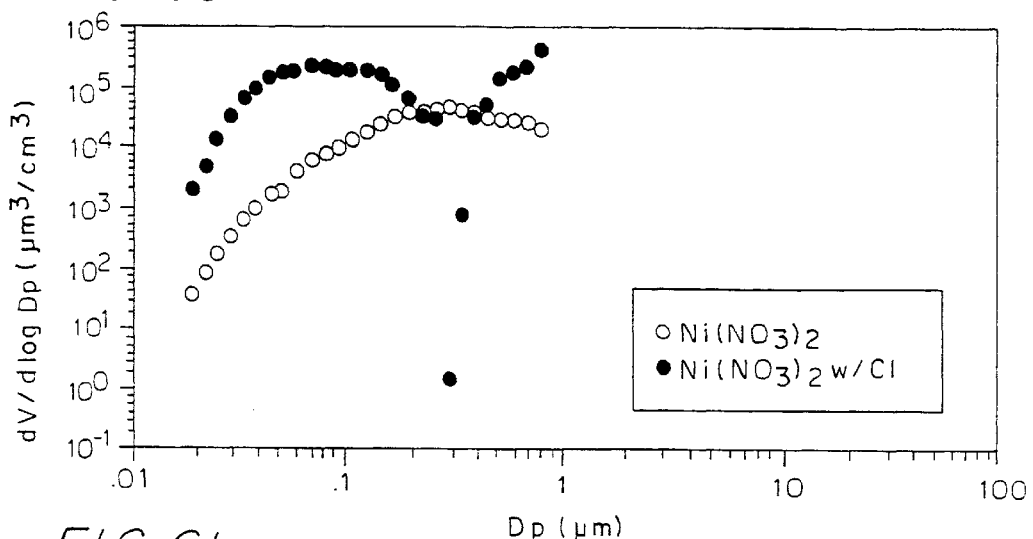
FIG. 6a, $Ni(NO_3)_2$.
Figure 6B:
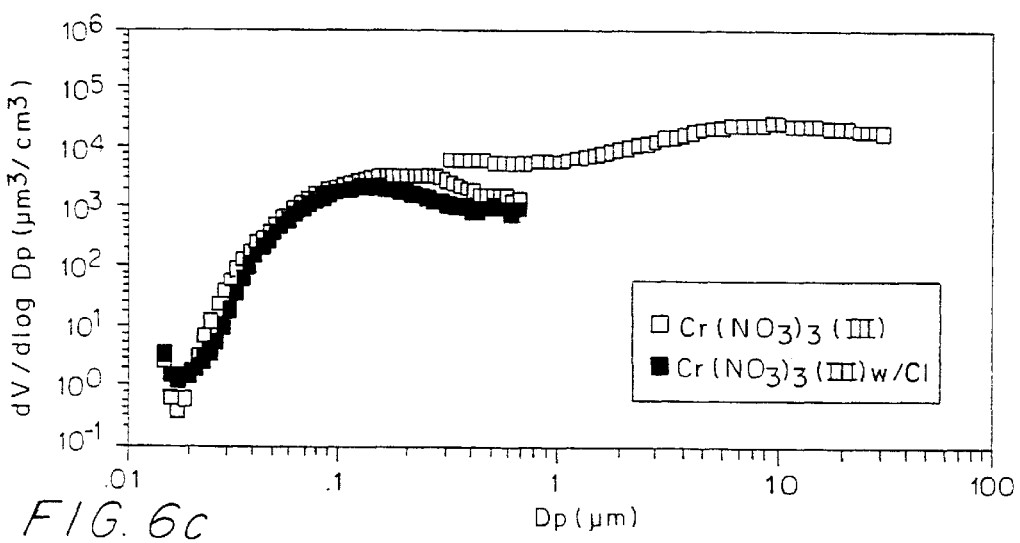
FIG. 6b, $Cr(NO_3)_3$(III)
Figure 6C:
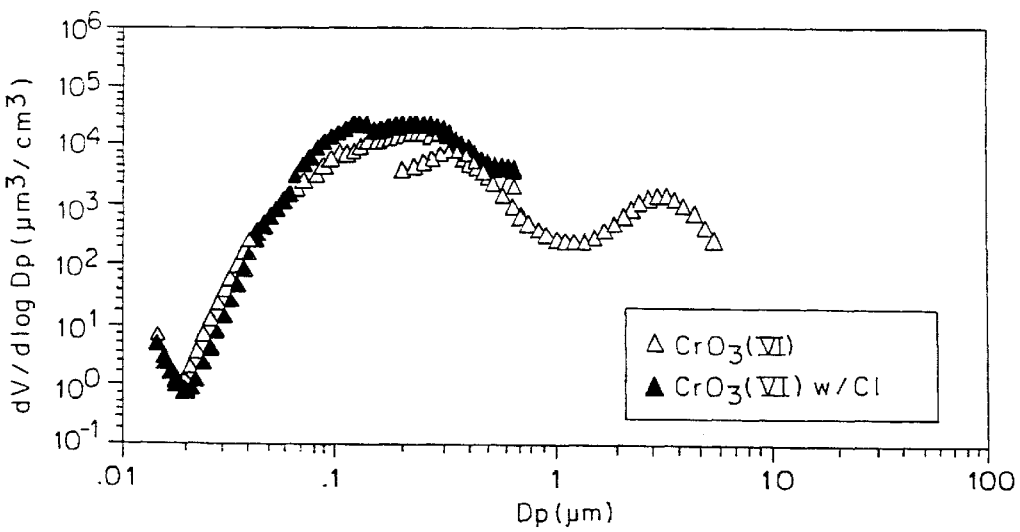
FIG. 6c $CrCO_3$(VI) aqueous solution feeds with and without chlorine.

The nickel scanning mobility particle sizer volume particle size distribution without chlorine, shown in FIG. 6a, exhibited a maximum at about 0.3–0.4 micron diameter. This is corroborated by the corresponding impactor results on FIG. 7a. For Cr(III) without chlorine, a single particle size mode peaking between 1.0 and 10 microns diameter is shown by both the in situ light scattering particle sizer data (FIG. 6b) and the impactor data (FIG. 7b). For Cr(VI), two models are apparent from the scanning mobility particle sizer and the in situ light scattering particle sizer, with a dominant mode peaking at about 0.1–0.3 micron diameter (FIG. 6c). This is verified by the impactor results shown in FIG. 7c, which also shows a dominant mode at about 0.2–0.3 micron diameter. These results suggest that CrO$_3$(VI) devolatilized while Cr(NO$_3$)$_3$(III) did not. The difference in volatilization behavior of the two different chromium compound is, of course, in contrast to equilibrium predictions, which are independent of the initial chromium speciation. Because there was some doubt that these small particles were caused by vaporization, additional experiments were conducted to investigate whether one could create additional devolatilization, as demonstrated by the appearance of larger amounts of even smaller fume particles, by imposing substantially higher combustion temperatures.

Figure 8:
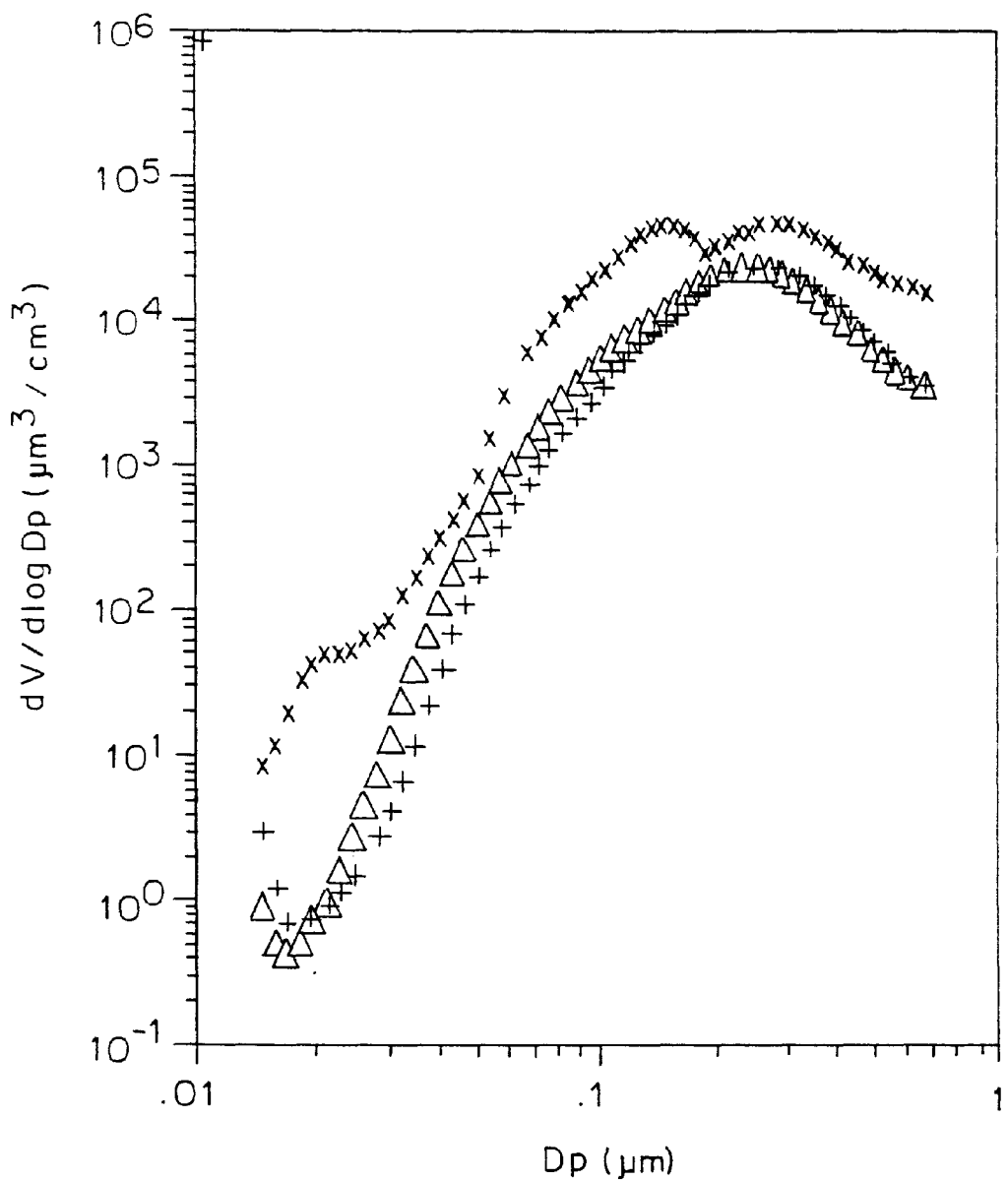
FIG. 8 shows particle volume distributions measured by electrical mobility for $CrO_3$(VI) aqueous solution feeds with oxygen enrichment of the combustion air (24–26% $O_2$) and with oxygen enrichment and chlorine.

FIG. 8 presents additional data for CrO$_3$(VI) resulting from higher temperature experiments, where oxygen enrichment (24–26%) produced measured temperatures that were approximately 125° K higher. FIG. 8 depicts no significant change in the chromium particle size distribution and no evidence of additional devolatilization, most probably because the CrO$_3$(VI) was extensively vaporized under all conditions examined. Under baseline conditions, the particles were collected primarily on the bottom impactor plate (stage 7), cf. FIG. 6c, rather than on the after filter, because the high chromium dewpoint still allowed substantial particle coagulation to occur before sampling.

Effect of Chlorine

Chlorine has a significant effect on the nickel number and volume particle size diameters. The maximum number concentration now occurs at 0.03 micron diameter (data now shown), while the maximum volume concentration shifted to particle diameters less than 0.1 micron. These particle size diameters are consistent with a nucleation/vaporization mechanisms form nickel in the presence of chlorine. The chromium results, in contrast, showed that chlorine had no effect on the stack particle size diameter, as illustrated by comparing the open and shaded symbols on FIGS. 6b and 6c. In the case of Cr(NO$_3$)$_3$(III), the chlorine did not facilitate vaporization, while in the case of CrO$_3$(VI), which vaporized without chlorine, no difference was noted in particle size diameter.

With oxygen enrichment, as shown in FIG. 8, chlorine appeared to produce a slight increase in the number of small particles, and also produced a multi-modal particle size diameter, possibly because of the appearance of multiple chlorinated chromium species with different nucleation characteristics. This multi-modal behavior is also evident for CrO$_3$(VI) without oxygen enrichment (FIG. 6c). The nickel and chromium results are qualitatively consistent with the equilibrium predications of FIG. 5, which show the effect of chlorine to be that of moving the nickel dewpoint from above that of chromium to below that of chromium. According to both theory and experiment, chlorine facilitated nickel volatilization at high temperatures, but has little effect on chromium. However, the results are inconsistent with the low temperature equilibrium predictions of chromium with chlorine, since the chromium was found to condense at low temperature [i.e, the predicted equilibrium yield of almost 100% gaseous $CrOCl_4(VI)$ and $CrCl_6(VI)$ was not observed].

Scanning Electron Micrographs

In the absence of chlorine, neither $Ni(NO_3)_2$ or $Cr(NO_3)_3(III)$ appeared to vaporize, although $CrO_3(VI)$ did vaporize. Yet, even in the absence of vaporization, a significant quantity of submicron particles was formed (FIGS. 6 and 7). The issue now is to explain how small particles are created from refractory compounds without having recourse to vaporization/nucleation processes. Mulholland and Sarofim (1991) and Mulholland et al. (1991) have shown that $Ni(NO_3)_2$ can form cenospheres, which can fragment to form small particles. In their studies this yielded a tri-model particle size diameter using a cascade impactor. This trimodal behavior was not observed in the presently described experiments with either the impactor or the scanning mobility particle sizer. It is thought that differences in heating rates in the two experiments account for this.

Figure 9A:
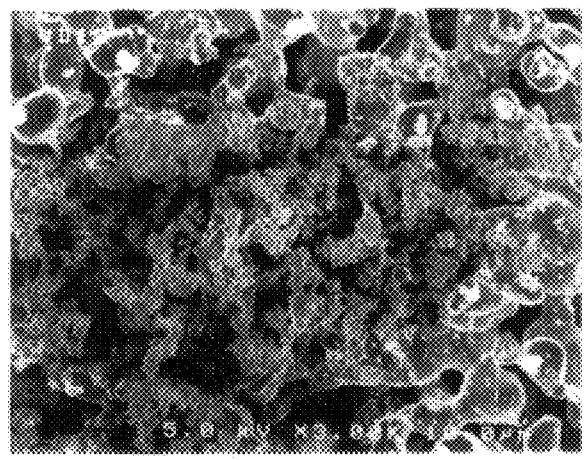
Figure 9B:
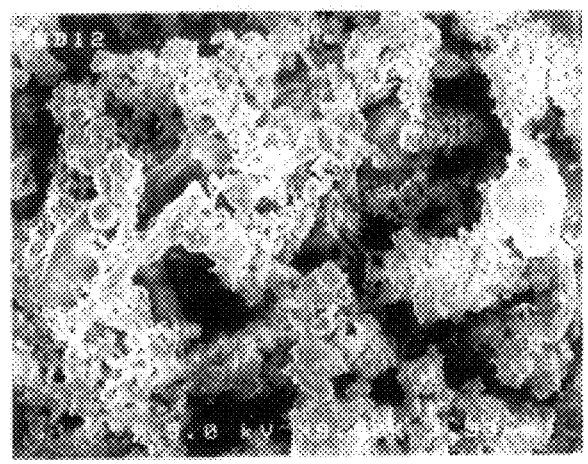
Figure 9C:
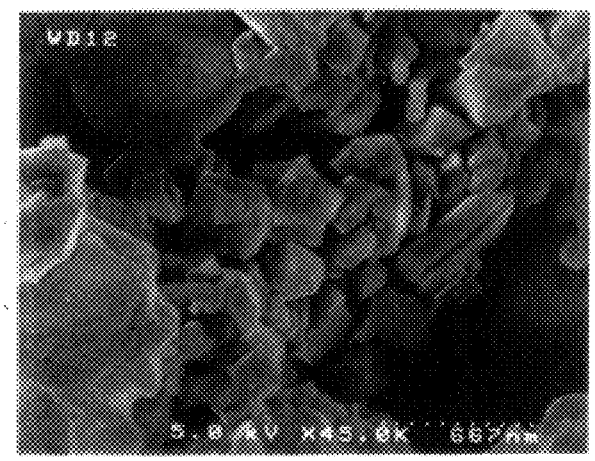

FIG. 9 presents a series of three magnifications of a scanning electron microscope image of an exhaust particulate sample from the $Cr(NO_3)_3(III)$ experiments with chlorine present. FIG. 9a (3000× magnification) shows a coagulated agglomerate on a silver filter. FIG. 9b (9000×) shows greater detail and suggests that a variety of particle shapes are present. FIG. 9c (45,000) distinctly shows the presence of tiny, well-formed crystals with angular sides. EDX analyses show that the elongated crystal located in the right center of FIG. 9c contains both chromium and chlorine. The mechanism by which the tiny crystals were formed, and by which chlorine is found within only a limited number of spherical particles, is not known. Scanning electron microscopes micrographs of the samples from the $CrO_3(VI)$ experiments show a very finely divided amorphous powder, and were very different from those shown in FIG. 9. These results support the hypothesis that the two chromium species followed very different mechanistic paths from inlet to sample. However, based on sample color and difficult solubility, the predominant chromium species sampled for all of the chromium experiments is believed to be $Cr_2O_3$ (III). This was independent of whether $Cr(NO_3)_3(III)$ or $Cr(NO_3)_3$ (VI) was fed.

Chromium Partitioning

Figure 5D:
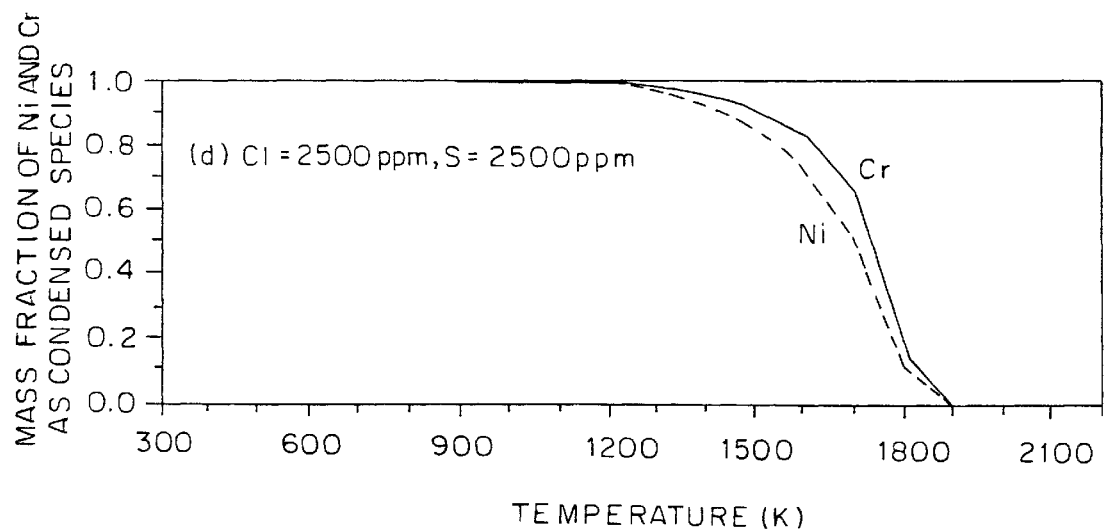

With respect to chromium, chemical separation is of paramount importance. Equilibrium predications of chromium speciation (Linak et al, 1996) suggested that in the absence of chlorine, the fraction of Cr(VI) is small and only appears at the higher temperatures. When chlorine is added, two additional Cr(VI) species are predicted to appear at lower temperatures: $CrOCl_4(VI)$ and $CrCl_6(VI)$. EDX analysis, shown in FIG. 9, shows that chlorine is found only on the fused spherical particles, and not on the angular crystalline particles. The equilibrium calculations at low temperatures do not predict the existence of a solid species containing chromium, which may indicate that kinetic limitations prevent significant Cr(VI) formation. Whatever the formation route to chlorinated chromium in the exhaust, sulfur is predicted by equilibrium, as shown in FIG. 5d, to eliminate those species and thus eliminate one source of Cr(VI).

FIG. 10 shows the fraction of measured chromium that appeared as Cr(VI) in the stack as a function of the stack sulfur concentration. Chlorine has been shown to enhance Cr(VI) formation, Linak et al., 1996. With 2500 ppm chlorine (0 ppm sulfur), approximately 1% of the total exhaust chromium measured was Cr(VI). This is a slightly smaller percentage than reported by Linak et al. 1996. However, that study examined higher chlorine concentrations, i.e., chlorine concentrations greater than 6000 ppm. As sulfur is added, the fraction of Cr(VI) decreases to below analytical detection limits. This is roughly consistent with equilibrium predictions, shown in FIG. 10, where speciation data are compared to equilibria at two different temperatures. No particular significance should be placed on these temperatures since they were chosen arbitrarily, with T=600° K shown only because it allowed chromium partitioning to be matched for the 0 ppm sulfur case. Both theory and experiment suggest that the reason that sulfur is so effective in eliminating Cr(VI) is because it displaces chlorine from the Cr(VI) compounds otherwise formed without sulfur. Both theory and experiment suggest that only a very small amount of sulfur, determined by the chromium/sulfur stoichiometry, is sufficient to suppress chlorinated Cr(VI) compounds.

Sorbent Scavenging of Refractory Metals

One would not expect metals that are not vaporized to be scavenged by sorbents, such as kaolinite or lime. Since vaporization of both $Ni(NO_3)_3$ with chlorine and $CrO_3(VI)$, with and without chlorine, was noted to have occurred, metal/sorbent interactions were investigated for all of the cases reported on FIG. 6.

Figure 11A:
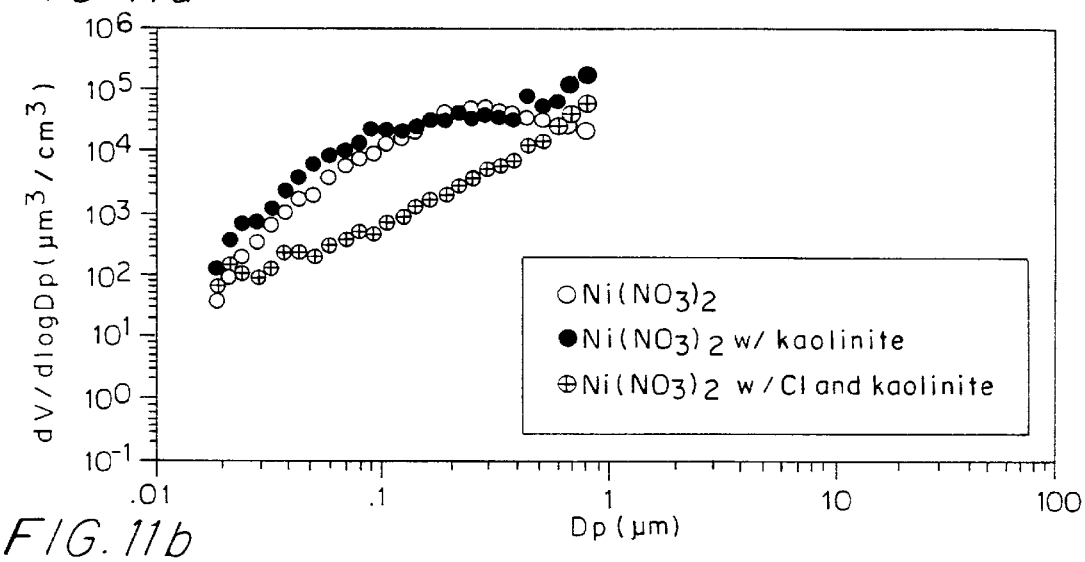
FIG. 11a, $Ni(NO_3)_2$.
Figure 11B:
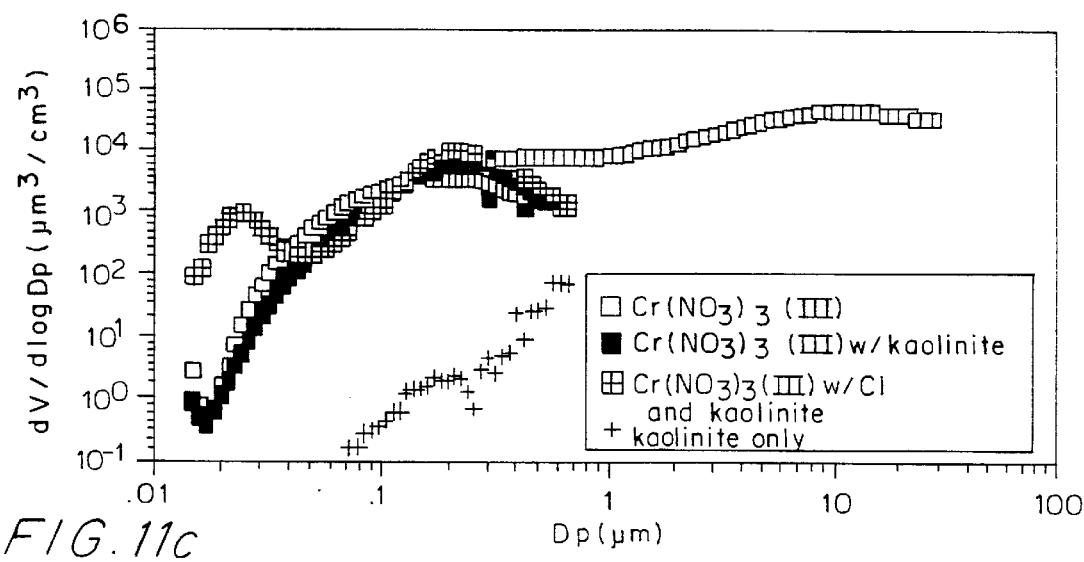
FIG. 11b, $Cr(NO_3)_3$(III)
Figure 11C:
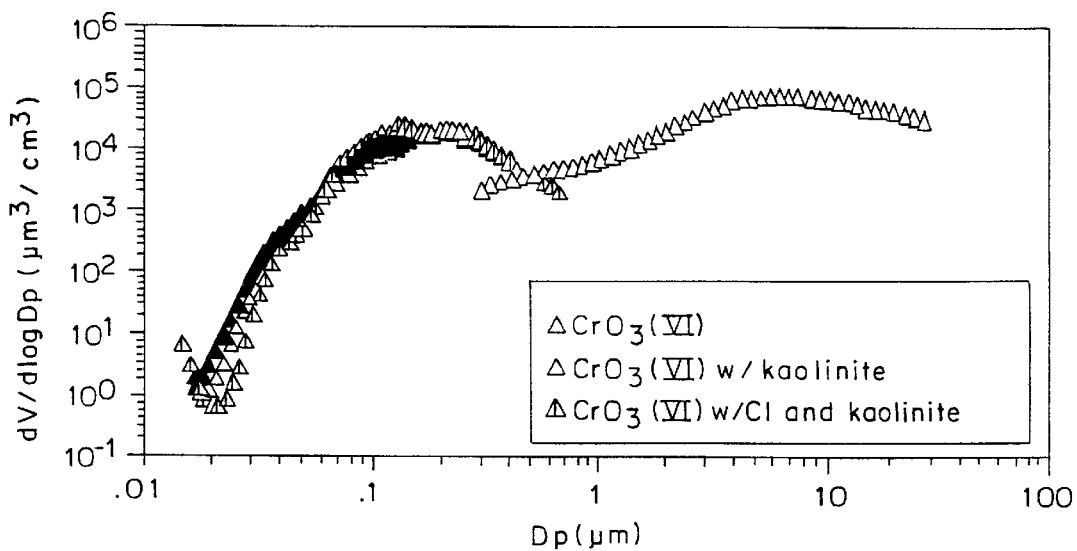
FIG. 11c $CrCO_3$(VI) aqueous solution feeds with and without kaolinite and chlorine.

The results for nickel are especially interesting. Nickel does not vaporize without chlorine (cf. FIGS. 6a and 7a), and, therefore, cannot react as a vapor with kaolinite sorbent (FIG. 11a). The effect of kaolinite addition is only to add to the coarse particle size mode at 1.0 micron diameter, which is at the upper limit of the scanning mobility particle sizer data, and the smaller particles are not affected. This is consistent with coagulation thereof (Linak and Wendt, 1993), which indicates that coagulation between small and large particles is too slow to allow metal particle scavenging by sorbent particles. When chlorine is added, nickel appears to vaporize, as shown in FIG. 6a, and consequently, nickel also appears to interact with kaolinite, as shown by the decrease in the very small particle mode which was present without the sorbent (FIG. 11a). Hence, chlorine allows nickel to volatilize and consequently be scavenged by kaolinite. The pertinent mechanism may, however, be quite complicated, since other research (Scotto et al., 1992; Linak et al., 1995) has shown that chlorine tends to diminish the scavenging reaction rate for cadmium and lead.

FIG. 7 also shows the effects, or rather the lack of an effect, of kaolinite injection on the chromium particle size diameter for both $Cr(NO_3)_3(III)$ and for $CrO_3(VI)$. For $Cr(NO_3)_3(III)$, this is not surprising since that compound did not vaporize. However, there was also no sorbent scavenging effect on $CrO_3(VI)$, even though that compound was believed to vaporize. Possible explanations include low interaction affinity between chromium and kaolinite and the possibility that the chromium vapor may not have been present long enough to contact the sorbent, which was injected downstream of the flame (cf. FIG. 5). FIGS. 6 and 7 show that chromium from $CrO_3(VI)$ underwent coagulation over a longer period of time than did nickel with chlorine, presumably because it had a higher effective dewpoint. Lime also had negligible effect on the particle size diameters from $Cr(NO_3)_3(III)$ and $CrO_3(VI)$, and so it can be concluded that lime is an ineffective sorbent for all forms of chromium tested, whether vaporization occurred or not.

As can readily be seen from the above, nickel did not vaporize under baseline conditions, but did vaporize upon the introduction of chlorine with the combustion air. When nickel vaporized, a portion of the nickel (70–80%) could be scavenged by kaolinite.

Whether chromium vaporized depended on the form in which chromium entered the combustor. When it was introduced as aqueous $Cr(NO_3)_3(III)$ it did not vaporize, even upon the addition of chlorine. When chromium was introduced as aqueous $CrO_3(VI)$ it did vaporize, both with or without chlorine present. No matter how it entered, or whether, indeed, it vaporized, chromium in the exhaust contained very little Cr(VI). The mechanistic paths which chromium follows upon its introduction into a furnace are not known, but depend on the initial form of the metal, even through the ultimate separation does not. Sub-micron metal crystals were observed from chromium that did not vaporize, suggesting that physical as well as chemical processes play important roles in determining resultant particle size diameters. Chlorine-enhanced Cr(VI) formation in the exhaust. However, even in the presence of 2500 ppm chlorine, a maximum of less than 1% of the total chromium measured in the exhaust was Cr(VI). This fraction of Cr(VI) could be reduced below analytical detection limits by stoichiometric (with respect to Cr) addition of sulfur.

Equilibrium predictions were useful in explaining directional trends of the experimental data. This was especially true with respect to the effects of sulfur on Cr(VI). Equilibria could not predict the observed effects of inlet Cr speciation, but was useful in explaining how chlorine influenced nickel vaporization without having a significant effect on chromium. Quantitative predictions form equilibria, however, should be made with due caution.

The foregoing description of the specific embodiments will so fully reveal the general nature of the invention that other can, by applying current knowledge, readily modify and/or adapt for various applications such specific embodiments without departing from the generic concept, and therefore such adaptations and modifications are intended to be comprehended within the meaning and range of equivalents of the disclosed embodiments. It Is to be understood that the phraseology or terminology herein is for the purpose of description and not of limitation.

REFERENCES

Baliff, et al, "Hexavalent chromium in hazardous waste incineration facilities: from stack emissions to health risks", AWMA Specialty Conference, Kansas City, Mo., April 1990.

Barin, et al., *Thermochemical Properties of Inorganic Substances*, Pringer-Verlag, New York, N.Y. (1973).

Barin, et al, *Thermochemical Properties of Inorganic Substances*, supplement, Springer-Verlag, New York, N.Y. (1977).

Barin, I., *Thermochemical Data of Pure Substances*, VCH Verlagsgesellschaft, New York, N.Y. (1989).

Barin, I., *Thermochemical Data of Pure Substances*, VCH Verlagsgesellschaft, New York, N.Y. (1993).

Barton, et al, "Fate of metals in waste combustion systems", *Combust. Sci. and Technol.*, 74:327–342 (1990).

CAAA—Clean Air Act Amendments, Public Law 101–549, 104 Stat. 2399–2712, Nov. 15 (1990).

Chase, et al, *JANAF Thermochemical Tables*, 3rd Ed., parts 1&2, American Institute of Physics, new York, N.Y. (1986).

Davison, et al, "Trace elements in fly ash dependence of concentration on particle size, *Environ. Sci. Tech.*, 8(13) :1107–1113.

Ebbinghaus, B. B., "Thermodynamics of gas phase chromium species: the chromium chlorides, oxychlorides, fluorides, oxyfluorides, hydroxides, oxyhydroxides, mixed oxyfluorochlorohydroxides, and volatility calculations in waste incineration processes", *Combust. & Flame*, 101:119–137 (1993).

Ebbinghaus, B. B., "Thermodynamics of gas phase chromium species: the chromium oxides, chromium oxyhydroxides, and volatility calculations in waste incineration processes", *Combust. & Flame*, 93:311–338 (1995).

EPA Method 0060—"Methodology for the determination of metals emissions in exhaust gases from hazardous waste incineration and similar combustion processes", in methods manual for compliance with the BIF regulations, EPA/530-SW-91-010 (NTIS PB91-120006), pp. 3-1 through 3-48, Washington D.C. (1990).

EPA Method 0061—"Determination of hexavalent chromium emissions from stationary sources", in methods manual for compliance with the BIF regulations, EPA/530-SW-91-010 (NTIS PB91-120006), pp 3-49 through 3-69, Washington, D.C. (1990).

Fontijn, et al, "Gas-phase oxidation kinetics of toxic metals at incinerator temperatures. The reactions of chromium atoms with HCL, $N_2O$, $Cl_2$ and $O_2$", *Combust. Sci. and Technol.*, 101(1–6):59–73 (1994).

Garg, S., "Technical implementation document for EPA's boiler and industrial furnace regulations", EPA-530/R-92-011 (NTIS PB92-154947), U.S. EPA, Office of Solid Waste, Washington, D.C. (1992).

Gordon, et al, "Computer program for calculation of complex chemical equilibrium compositions, rocket performance, incident and reflected shocks, and Chapman-Jouguet detonations", NASA SP-273, Interim Revision (1986).

Gloyer, R. A., "Toxic Effects of Metals," in Casarett and *Doull's Toxicology: The Basic Science of Poisons*, 4th ed., Amdur, et al, eds., Pergamon Press, New York, N.Y. (1991).

Klein, et al, "Pathways of thirty-seven trace elements through coal-fired power plant", *Environ. Sci. Technol.*, 9(10):973–979 (1975).

Linak, et al, "Toxic metal emissions from incineration: mechanisms and control", *Prog. Energy Combust. Sci.*, 19:145–185 (1993).

Linak, et al, "Metal aerosol formation in a laboratory swirl flame incinerator", *Combust. Sci. Technol.*, 101(1–6) :7–27 (1994).

Linak, et al, "Sorbent capture of nickel, lead, and cadmium in a laboratory swirl flame incinerator", *Combust. & Flame*, 100:241–248 (1995).

Linak, et al, "Formation and destruction of hexavalent chromium in a laboratory swirl flame incinerator", *Combust. Sci. Technol.*, 116–117:479–498 (1996).

Markowski, et al, "A submicron aerosol mode in flue gas from a pulverized coal utility boiler", *Environ. Sci. Technol.*, 14(11) :1400–1402 (1980).

McBride, et al, "Coefficients for calculating thermodynamic and transport properties of individual species", NASA Technical Memorandum 4513 (1993).

Mulholland, et al, "Mechanisms of inorganic particle formation during suspension heating of simulated aqueous wastes", *Environ. Sci. Technol.*, 25(2):268–274 (1991)

Mulholland, et al, "The formation of inorganic particles during suspension heating of simulated wastes", *Environ. Prog.*, 10(2):83–88 (1991).

Quann, et al, "Vaporization of refractory oxides during pulverized coal combustion", 19th Comb. (Int.) Symp., 1429–1440, Comb. Inst., Pittsburgh (1982).

RCRA—Resource Conservation and Recovery Act, Subtitle C, Sections 3001–3013, 42 N.S.C., Sections 6921–6934 (1976) and Supplement IV (1980) amended (1986).

Rizeq, et al, "Prediction of metals emissions and partitioning in coal-fired combustion system", *Fuel Processing Technol.* 39:219–236 (1994).

Scotto, et al, "Hazardous waste incineration: the in-situ capture of lead by sorbents in a laboratory down-flow combustor", 24th Comb. (Int.) Symp., 1109–1118, Comb. Inst., Pittsburgh (1992).

Seigneur, et al, "Chemical kinetic mechanism for atmospheric chromium", *Environ. Sci. Technol.*, 29:222–231 (1995).

Slaughter, et al, "Influence of coal mineral matter on the effectiveness of dry sorbent injection for $SO_2$ control", EPA-600/7-87-020 (NTIS PB88-178587), Research Triangle Park, N.C. (1987).

Smirnov, V. N., "On the anomalously high rate of recombination $Cr+O_2+M \rightarrow CrO_2+M$", *Kinetics and Catalysis*, 34(5):699–703 (1993).

Trinchon, et al, "Chemical kinetic considerations of trace toxic metals in incinerators", 1989 Incineration Conference, Knoxville, Tenn., May, 1989.

U.S. EPA Office of Solid Waste, "Guidance on metal and hydrogen chloride controls for hazardous waste incinerators, volume IV of the hazardous waste guidance series, Hazardous Waste: boilers and industrial furnaces; burning of hazardous wastes, 7134, *Federal Register*, 56(35) (1991).

Wendt, J. O. L., "Combustion science for incineration technology, 25th Comb. (Int.) Symp., 277–289, Comb. Inst., Pittsburgh (1994).

What is claimed is:

1. A method for minimizing the amount of hexavalent chromium present in combustion air streams resulting from burning combustibles containing chromium comprising adding a stoichiometric amount of sulfur to said combustibles prior to or during burning with respect to chromium to said ambustible, and burning said combustibles.

2. A method in accordance with claim 1, wherein the sulfur is added in an amount to provide at least about 100 ppm sulfur.

3. A method in accordance with claim 1, wherein the sulfur is obtained from a member of the group consisting of high sulfur hydrocarbons, high sulfur coal, and mixtures thereof.

4. A method for converting hexavalent chromium present in combustion air streams resulting from burning combustibles containing hexavalent chromium to trivalent chromium comprising adding a stoichiometric amount of sulfur to said combustibles prior to or during burning with respect to hexavalent chromium to said combustibles and burning said combustibles whereby said hexavalent chromium is reduced to trivalent chromium.

5. A method in accordance with claim 4, wherein the sulfur is added in an amount to provide at least about 100 ppm sulfur.

6. A method in accordance with claim 4, wherein the sulfur is obtained from a member of the group consisting of high sulfur hydrocarbons, high sulfur coal, and mixtures thereof.

* * * * *